United States Patent [19]
Misawa et al.

[11] Patent Number: 5,765,380
[45] Date of Patent: Jun. 16, 1998

[54] AIR-CONDITIONING APPARATUS USING RADIATION HEAT CONTROL SYSTEM AND METHOD FOR STABLE AIR-CONDITIONING OPERATION

[75] Inventors: Makoto Misawa; Hideyuki Ohashi; Katsuyuki Nagura, all of Shizuoka, Japan

[73] Assignee: Yamaha Hatsudoki Kabushiki Kaisha, Shizuoka, Japan

[21] Appl. No.: 708,894

[22] Filed: Sep. 5, 1996

[51] Int. Cl.$^6$ .................................................. F25B 41/00
[52] U.S. Cl. .................. 62/210; 62/238.7; 62/323.1; 62/503
[58] Field of Search ............... 62/210, 238.6, 62/238.7, 503, 323.1, 160, 211, 223; 165/240, 241, 242

[56] References Cited

U.S. PATENT DOCUMENTS

| | | | |
|---|---|---|---|
| 4,217,765 | 8/1980 | Ecker | 62/503 |
| 4,311,192 | 1/1982 | VanderVaart | 62/238.6 X |
| 5,003,788 | 4/1991 | Fischer | 62/238.7 |

*Primary Examiner*—Harry B. Tanner
*Attorney, Agent, or Firm*—Knobbe, Martens, Olson & Bear, LLP

[57] ABSTRACT

An air-conditioning apparatus for heating or cooling a room, having a flow control or heat capacity control mechanism for conducting, when heating the room, at least one of the steps of: exerting energy onto the refrigerant; reducing heat exchanged between the air surrounding the evaporator and the refrigerant passing through the evaporator; and enlarging the opening of the expansion valve, thereby preventing the liquid refrigerant from flowing into the compressor, and efficiently conducting heating operation when the outside temperature is very low or when refrigerant circulation pipes are long.

9 Claims, 20 Drawing Sheets

Figure 7

AIR-CONDITIONING APPARATUS USING RADIATION HEAT CONTROL SYSTEM AND METHOD FOR STABLE AIR-CONDITIONING OPERATION

BACKGROUND

1. Field of the Invention

This invention relates to an air-conditioning apparatus, and in particular, to such an apparatus provided with a radiation heat control system which allows for stable air-conditioning operation, especially heating operation, by compensating for insufficient endothermic heat capacity due to a cold or windy environment or the occurrence of pressure loss in a refrigerant circulation line. This invention also relates to a method for stable air-conditioning operation.

2. Background of the Art

A heat pump air-conditioning apparatus enables cooling or heating the air in a room by circulating refrigerant in a refrigerant circulation line through a condenser, an expansion valve, and an evaporator, in sequence, with a compressor driven by an engine or an electric motor, for example. In the heating mode, i.e., heating the air in a room, an outside heat-exchanger functions as an evaporator, and an inside heat-exchanger functions as a condenser.

The refrigerant passes through the expansion valve after radiating heat at the inside heat-exchanger in a room to be heated, thereby reducing the pressure and the temperature of the refrigerant, and then absorbs heat from the outside air at the outside heat-exchanger. This cycle is repeated so as to continuously heat the room.

However, when the outside temperature is below the temperature of the refrigerant circulating through the outside heat-exchanger, it is impossible to absorb heat from the outside air; rather, heat is radiated from the outside heat-exchanger, thereby reducing heating capacity.

Under the above conditions, pressure loss in the refrigerant increases because vaporization of the refrigerant in the outside heat-exchanger is suppressed, and the volume of liquid refrigerant passing through the line on the low pressure side increases. Accordingly, the pressure at the intake inlet of the compressor decreases, and the intake volume of vapor refrigerant (the flow rate by weight) introduced into the compressor decreases. Thus, the discharge pressure of the compressor and the amount of refrigerant passing through the inside heat-exchanger functioning as a condenser decreases, thereby increasing the radiation area per refrigerant weight/time. As a result, more vapor refrigerant condenses at the inside heat-exchanger (condenser), and the pressure in the high pressure refrigerant line decreases. Consequently, the pressure upstream of the expansion valve decreases, and thus, the difference between the pressure upstream of the expansion valve and the pressure downstream of the expansion valve cannot easily be increased. That is, the flow passing through the expansion valve decreases. Under the above conditions, heat-exchanging efficiency decreases, and heating capacity deteriorates.

In addition, when a pipe between the compressor and the expansion valve is long, pressure loss occurring due to the resistance to the flow in the pipe is added to pressure loss generated in the pipe of the inside heat-exchanger. Thus, the pressure immediately upstream of the expansion valve is decreased further, i.e., the amount of refrigerant flowing through the expansion valve is lowered. As a result, heat-exchanging efficiency is decreased, and heating capacity further deteriorates.

Further, when vaporization of the refrigerant in the outside heat-exchanger is suppressed, liquid refrigerant tends to flow into the compressor, resulting in lowing durability of the compressor.

SUMMARY OF THE INVENTION

The present invention has exploited an air-conditioning apparatus having stable heating capacity without significant influence from the environment surrounding an outside heat-exchanger (i.e., an evaporator when in the heating mode). An objective of the present invention is to provide an air-conditioning apparatus which allows for stable heating operation even when the outside is very cold or very windy, or when piping between the outside heat-exchanger and the inside heat-exchanger is long, and which increases durability of the compressor to be more durable by hindering an increase in the volume of refrigerant flowing into the compressor, even when the outside is very cold or very windy.

Namely, one important aspect of the present invention is an air-conditioning apparatus for heating or cooling a room, comprising a refrigerant circulation line in which a refrigerant circulates, said refrigerant circulation line comprising: a compressor for circulating said refrigerant; a condenser for exchanging heat between said refrigerant and the air outside said condenser; an expansion valve; and an evaporator for exchanging heat between said refrigerant and the air outside said evaporator, wherein said apparatus further comprises: a heat capacity detection mechanism for detecting the radiation heat capacity of said condenser and the endothermic heat capacity of said evaporator; and an energy-supplying mechanism for exerting energy onto said refrigerant when heating the room, according to the difference between said radiation heat capacity and said endothermic heat capacity. When heating the room, by exerting energy onto said refrigerant according to the difference between said radiation heat capacity and said endothermic heat capacity, it is possible to efficiently conduct heating operation even when the outside temperature is very low, or even when refrigerant circulation pipes are long, and it is possible to prevent deterioration of durability of the compressor by preventing an increase in the amount of the liquid refrigerant flowing into the compressor through the intake inlet thereof.

In the above the air-conditioning apparatus, when the energy-supplying mechanism exerts energy onto the refrigerant in such a way that the higher the difference between the radiation heat capacity and the endothermic heat capacity, the greater the energy exerted onto said refrigerant becomes, the above effects can be ensured.

Another important aspect of the present invention is an air-conditioning apparatus for heating or cooling a room, comprising a refrigerant circulation line in which a refrigerant circulates, said refrigerant circulation line comprising: a compressor for circulating said refrigerant; a condenser for exchanging heat between said refrigerant and the air outside said condenser; an expansion valve; and an evaporator for exchanging heat between said refrigerant and the air outside said evaporator, wherein said apparatus further comprises: a heat capacity detection mechanism for detecting the radiation heat capacity of said condenser and the endothermic heat capacity of said evaporator; and a heat-exchange control mechanism for reducing heat exchanged between the air surrounding said evaporator and the refrigerant passing through said evaporator when heating the room, according to the difference between said radiation heat capacity and said endothermic heat capacity. When heating the room, by reducing the exchanged heat at the evaporator according to the difference between said radiation heat capacity and said endothermic heat capacity, it is possible to efficiently conduct heating operation even when the outside temperature is very low (e.g., lower than the temperature of the refrigerant), or even when refrigerant circulation pipes are long, and it is possible to prevent deterioration of durability of the compressor by preventing an increase in the amount of the liquid refrigerant flowing into the compressor through the intake inlet thereof.

In the above air-conditioning apparatus, when the heat-exchange control mechanism reduces or discontinues the refrigerant flow passing through said evaporator, it is possible to obtain the above effects with simple structures.

In the above air-conditioning apparatus, when said heat-exchange control mechanism comprises a bypass line bypassing said evaporator, and a bypass flow control mechanism for controlling the flow passing through said bypass line, it is also possible to obtain the above effects with simple structures.

Still another important aspect of the present invention is an air-conditioning apparatus for heating or cooling a room, comprising a refrigerant circulation line in which a refrigerant circulates, said refrigerant circulation line comprising: a compressor for circulating said refrigerant; a condenser for exchanging heat between said refrigerant and the air outside said condenser; an expansion valve; and an evaporator for exchanging heat between said refrigerant and the air outside said evaporator, wherein said apparatus further comprises: a flow detection mechanism for detecting the amount of the refrigerant flow passing through said expansion valve; and a flow control mechanism for controlling the refrigerant flow when heating the room, according to the detected flow passing through said expansion valve, by conducting at least one of the steps of: exerting energy onto said refrigerant; reducing heat exchanged between the air surrounding said evaporator and the refrigerant passing through said evaporator; and enlarging the opening of said expansion valve. When heating the room, by conducting at least one of the above steps, it is possible to efficiently conduct heating operation even when the outside temperature is very low (e.g., lower than the temperature of the refrigerant), or even when refrigerant circulation pipes are long, and it is possible to prevent deterioration of durability of the compressor by preventing an increase in the amount of the liquid refrigerant flowing into the compressor through the intake inlet thereof.

In the above air-conditioning apparatus, when said flow detecting mechanism comprises a high pressure sensing means for sensing the pressure in the line on the high pressure side between said compressor and said expansion valve, and a decision means for determining the flow passing through said expansion valve in such a way that the lower the pressure detected, the lower the flow becomes, it is possible to obtain the above effects with simple structures.

In the above air-conditioning apparatus, when said flow detecting mechanism comprises a high pressure sensing means for sensing the pressure in the line on the high pressure side between said compressor and said expansion valve, a low pressure sensing means for sensing the pressure in the line on the low pressure side between said expansion valve and said compressor, and a decision means for determining the flow passing through said expansion valve in such a way that the smaller the difference between the high pressure and the low pressure detected, the lower the flow becomes, it is also possible to obtain the above effects with simple structures.

In the above air-conditioning apparatus, when said flow detecting mechanism comprises: a pair of pressure sensing means provided apart from each other at least either in the line on the high pressure side between said compressor and said expansion valve or in the line on the low pressure side between said expansion valve and said compressor; and a decision means for determining the flow passing through said expansion valve in such a way that the greater the absolute difference between the pressures detected, the lower the flow becomes, it is also possible to obtain the above effects with simple structures.

In addition to the flow control-associated mechanism, the aforesaid air-conditioning apparatus can further comprise: a heat capacity detection mechanism for detecting the radiation heat capacity of said condenser and the endothermic heat capacity of said evaporator; and an energy-supplying mechanism for exerting energy onto said refrigerant when heating the room, according to the difference between said radiation heat capacity and said endothermic heat capacity.

Yet another important aspect of the present invention is an air-conditioning apparatus further comprising a four-way valve for reversing the flow of said refrigerant at said condenser and at said evaporator to switch the operation mode between the heating mode and the cooling mode, said four-way valve being provided downstream of said compressor, wherein said condenser is an inside heat-exchanger when in the heating mode and is an outside heat-exchanger when in the cooling mode, and said evaporator is said inside heat-exchanger when in the cooling mode and is said outside heat-exchanger when in the heating mode, wherein said energy-supplying mechanism is provided either in the high pressure refrigerant line between said compressor and said expansion valve via said inside heat-exchanger functioning as a condenser when in the heating mode or in the low pressure refrigerant line between said expansion valve and said compressor via said outside heat-exchanger functioning as an evaporator when in the heating mode. When in the heating mode, in the aspect wherein the energy-supplying mechanism is provided in the high pressure refrigerant line, the discharge pressure of the compressor and the amount of refrigerant passing through the inside heat-exchanger functioning as a condenser decreases due to insufficient endothermic heat capacity of the outside heat-exchanger functioning as an evaporator, thereby increasing the radiation area per refrigerant weight/time. As a result, more vapor refrigerant condenses at the inside heat-exchanger (condenser), and the pressure in the high pressure refrigerant line decreases. According to the above embodiment, the decreased pressure is compensated for by exerting energy onto the refrigerant in the high pressure refrigerant line, thereby increasing the pressure in the high pressure refrigerant line. Further, in the aspect wherein the energy-supplying mechanism is provided in the low pressure refrigerant line, insufficient endothermic heat capacity of the outside heat-exchanger functioning as an evaporator can be compensated for. A sufficient amount of liquid refrigerant in the low pressure refrigerant line can be vaporized and fed to the compressor, and then introduced to the high pressure refrigerant line. As a result, the radiation area per refrigerant weight/time does not increase, overcondensation of the vapor refrigerant is prevented, thereby preventing an decrease in pressure in the high pressure refrigerant line. That is, the endothermic heat and the energy provided by the work of the compressor can be balanced with the radiation heat.

In the above air-conditioning apparatus, the energy-supplying mechanism is provided preferably in the low pressure refrigerant line downstream of said four-way valve and upstream of said compressor when in the heating mode. According to this embodiment, it is possible to balance the endothermic heat and the energy provided by the compressor with the radiation heat not only in the heating mode but also in the cooling mode. When the energy-supplying mechanism is provided in an accumulator, which is provided as a refrigerant-heating means in the lower pressure refrigerant line upstream of the compressor, heat can efficiently be transferred to the liquid refrigerant, since liquid refrigerant has a higher heat-transfer efficiency than vapor refrigerant. Further, when the heat pump apparatus has a water-cooled engine, a cooling water heat-exchanger for exchanging heat between the cooling water circulating therethrough, which has absorbed heat from the water-cooled engine, and the refrigerant circulating therethrough, can be used as an energy-supplying mechanism. In this embodiment, exhaust heat from the engine can efficiently be used.

The present invention is adapted to be embodied in both a heat pump system and a heat pumping method. Further, the present invention is also adapted to be embodied in air-conditioning apparatuses for heating or cooling and in refrigerators, which are either engine-driven or electric motor-driven. In the above, the compressor, the condenser, the expansion valve, the evaporator, and the like are used as generic terms, and each can be composed of plural members, e.g., the compressor can be composed of plural compressors. Switching between the heating mode and the cooling mode can be conducted using a four-way valve for reversing the refrigerant flow, i.e., an inside heat-exchanger and an outside heat-exchanger function as the condenser and the evaporator, respectively, in the heating mode, and they perform the opposite functions in the cooling mode.

BRIEF DESCRIPTION OF THE FIGURES

FIG. 7 is a schematic cross-sectional view of the compressor system of FIG. 4, which is cross-sectioned along the VII—VII line.

DETAILED DESCRIPTION OF THE PREFERRED EMBODIMENT

Referring now in detail to the drawings, an air-conditioning apparatus is shown. The invention is shown in conjunction with an engine-driven air-conditioning apparatus for heating or cooling, since the invention has particular utility in conjunction with an engine. However, the invention can be embodied in conjunction with a refrigerator, and with an electric motor-driven air-conditioning system. Those skilled in the art can readily understand how the invention can be utilized with any known type of air-conditioning system.

In the present invention, an inside heat-exchanger is a heat-exchanger for exchanging heat between the refrigerant in a refrigerant circulation line of an air-conditioning system and the air inside a room of a building or inside a storage compartment (inner compartment) of a refrigerator. An outside heat-exchanger is, on the other hand, a heat-exchanger for exchanging heat between the refrigerant in the refrigerant circulation line of the air-conditioning system and the air outside the room of the building or outside the storage compartment (inner compartment) of the refrigerator; the outside heat-exchanger can be installed outside or inside the room (normally outside the room) in which the refrigerator is installed.

Basic Control System

Figure 1:
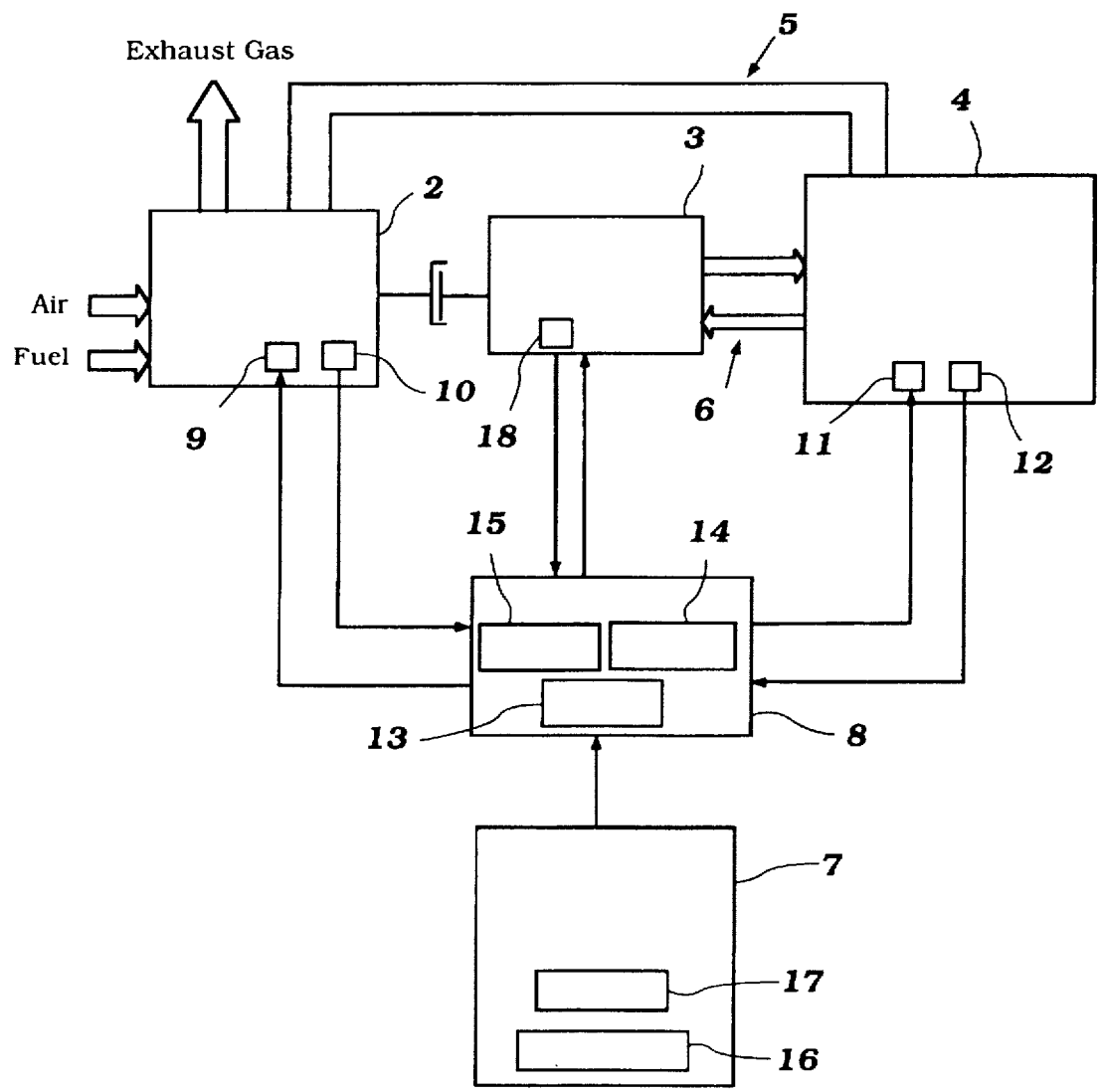
FIG. 1 is a schematic illustration showing basic structures of an engine-driven air-conditioning apparatus according to an embodiment of the present invention.

FIG. 1 is a schematic illustration showing basic structures of an engine-driven air-conditioning system used as an air conditioning apparatus according to an embodiment of the present invention.

An air-conditioning apparatus 1 functioning as an air-conditioning system comprises an engine unit 2 functioning as a driving power (an electric motor can be used instead), a compressor system unit 3, an air-conditioning unit 4, a hot water circulation line 5 in which cooling water from the engine unit 2 circulates between the engine unit 2 and the air-conditioning unit 4, and a refrigerant circulation line 6 in which pressurized refrigerant such as Freon circulates between the compressor system unit 3 and the air-conditioning unit 4. The engine unit 2, the compressor system unit 3, and the air-conditioning unit 4 are controlled by a control unit 8 according to signals from an operation unit 7.

The engine unit 2 is provided with an actuator unit 9 and a sensor unit 10, and information on engine performance from the sensor unit 10 is transmitted to the control unit 8 which then outputs signals to the actuator unit 9 controlling the engine unit 2. In the engine system, a mixed gas of air and fuel gas is provided with an engaged-compressor an induction system, and ignition occurs, followed by discharging exhaust gas through an exhaust system.

The compressor system unit 3 is comprised of plural compressors, and the number of engaged compressors (compressors in operation) of the compressor system unit 3 is controlled by signals from the control unit 8, depending on the air-conditioning load. The compressor system unit 3 is provided with an engaged-compressor detection means 18, from which performance information on the compressors is transmitted to the control unit 8. The air-conditioning unit 4 is operated by operation of the compressor system unit 3 via the refrigerant circulation line 6.

The air-conditioning unit 4 is comprised of an actuator unit 11 and a sensor unit 12, and information on air-conditioning performance from the sensor unit 12 is transmitted to the control unit 8 which then outputs signals to the actuator unit 11 controlling heating or cooling operation.

The control unit 8 is provided with a control means 13, a memory means 14, and a drive means 15. The control means 13 controls the drive means 15 based on the instructions from the operation unit 7, the information stored in the memory means 14, the information on engine performance from the sensor unit 10, and the information on air-conditioning performance from the sensor unit 12. By the drive means 15, the actuator unit 9, the compressor system unit 3, and the actuator unit 11 of the air-conditioning unit 4 are driven.

The operation unit 7 is provided with a switch unit 16 and a display unit 17. When an operator manipulates the switch unit 16, signals are transmitted to the control unit 8 so as to engage the air-conditioning system 1, and operation performance is indicated on the display unit 17.

Hereinafter, first, structures of an air-conditioning system according to the present invention will be described with reference to the drawings, and then the functions and effects of particular structures related to the present invention will be explained.

Structures of Air-Conditioning Apparatus

Figure 2:
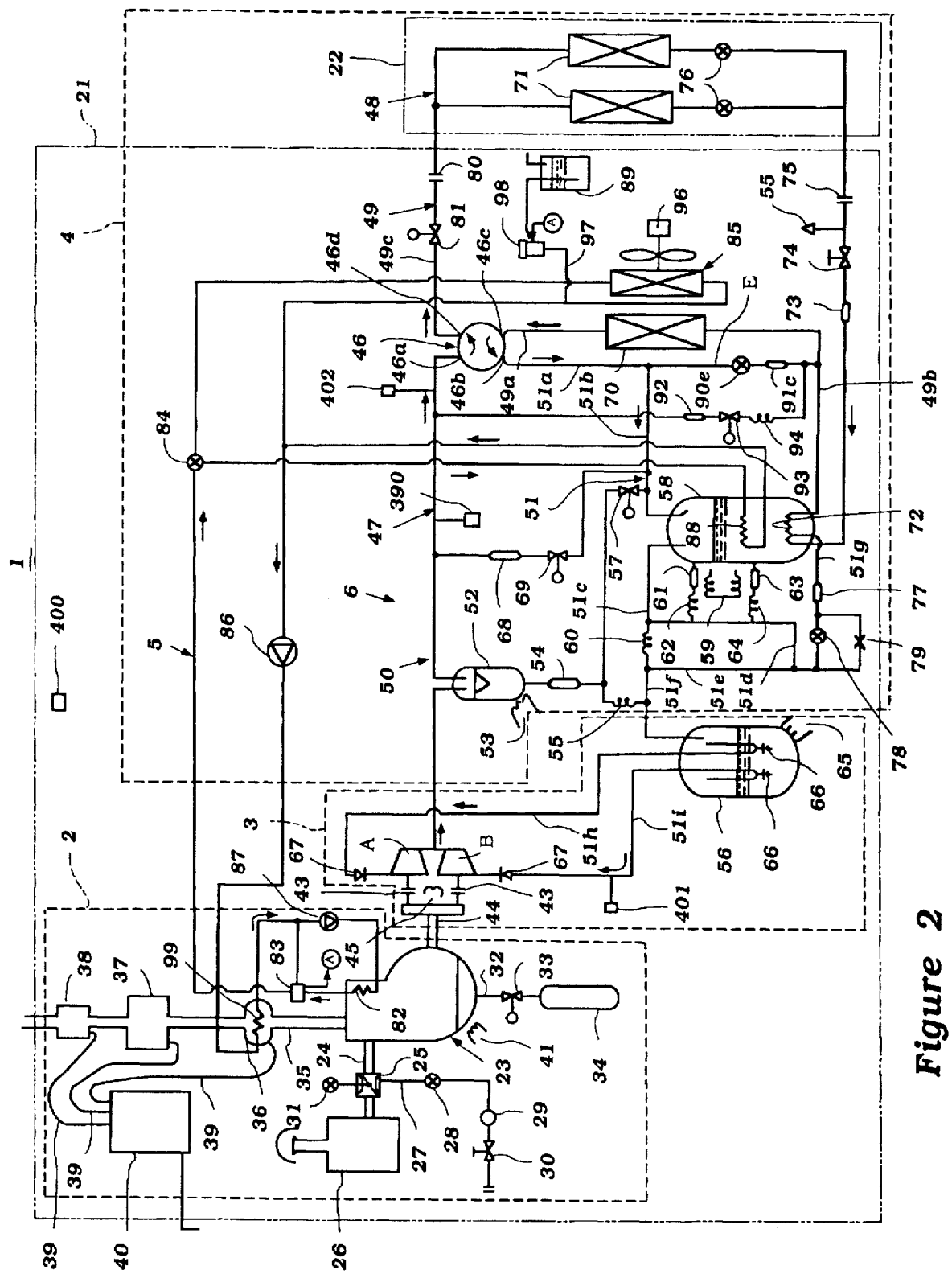
FIG. 2 is a schematic circuit illustrating structures of an engine-driven air-conditioning apparatus when in the cooling mode according to a first embodiment of the present invention.
Figure 3:
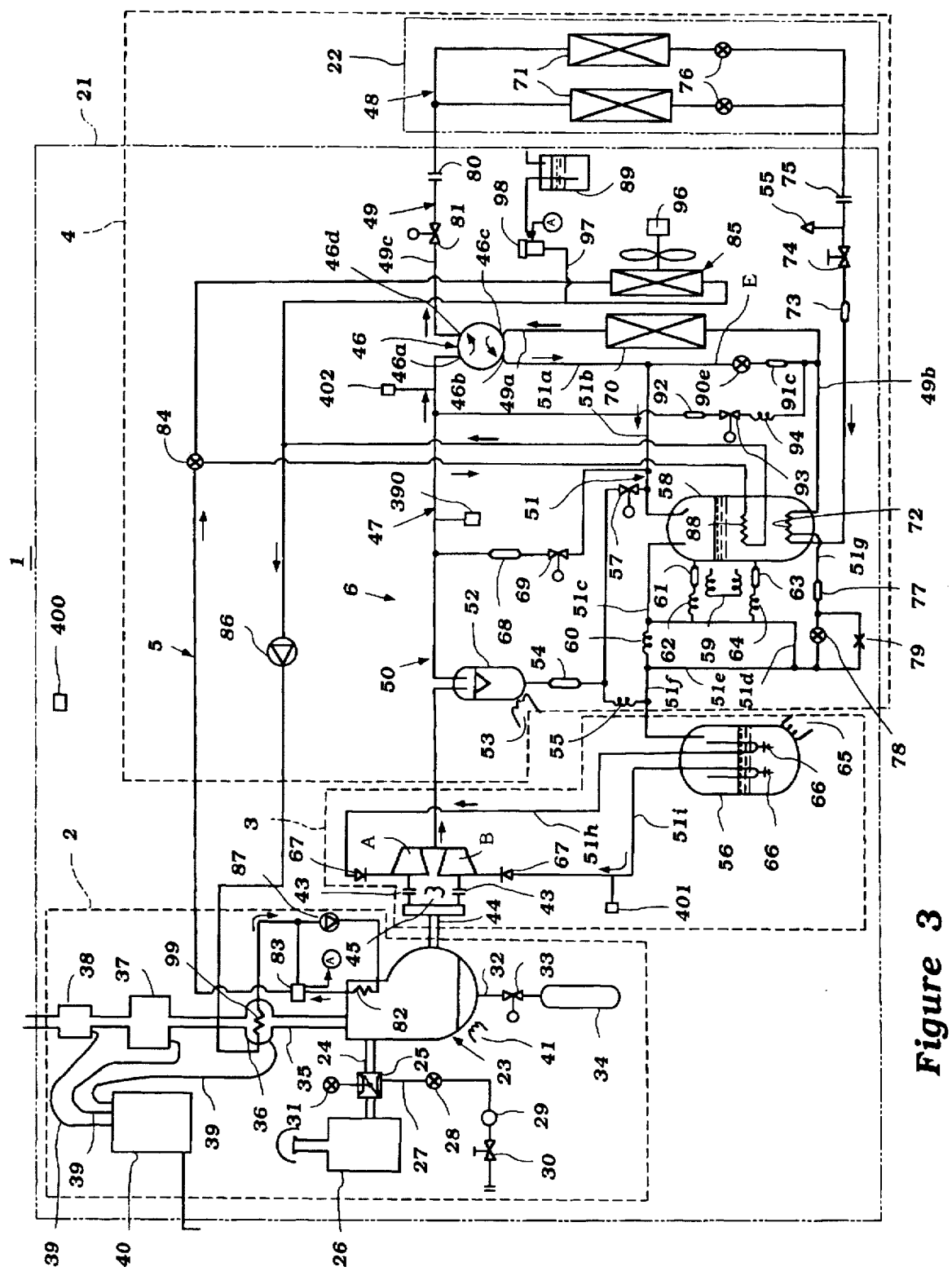
FIG. 3 is a schematic circuit illustrating structures of the air-conditioning apparatus of FIG. 2 when in the heating mode, according to an embodiment of the present invention.

Referring in detail to the drawings, and to a first embodiment shown in FIGS. 2–8 initially by reference to FIG. 2 (in the cooling mode), an air-conditioning apparatus 1 (engine-driven) is shown. FIG. 3 shows the same air-conditioning apparatus, but in the heating mode, in which the position of the four-way valve is changed so as to use the inside heat-exchanger and the outside heat-exchanger as a condenser and an evaporator, respectively. The system will be explained with reference to FIG. 2 (the cooling mode) for the sake of convenience.

The air-conditioning apparatus 1 comprises an outside unit 21 and an inside unit 22. An engine unit 2, a compressor unit 3, a hot water circulation line 5, and a refrigerant circulation line 6 are provided in the outside unit 21. An air-conditioning unit 4 is constituted by the inside unit 22 and a part of the outside unit 21.

The engine unit 2 includes a water-cooled engine 23, to which a mixer 25 and an air cleaner 26 are connected via an induction manifold 24. Air is supplied to the mixer 25 through the air cleaner 26. A fuel supply control valve 28 operated by a pulse motor, a reduced-pressure control valve 29, and an electromagnetic valve (gas on-off valve) 30 are connected to the mixer 25 via a connection pipe 27, thereby supplying fuel gas to the mixer 25. Fuel gas and air are mixed in the mixer 25, and then introduced into the water-cooled engine 23.

A replenishing control valve is connected to the water-cooled engine 23 via an oil (lubricant) replenishing line 32 leading to an oil (lubricant) tank 34 disposed at an upper position so that when the amount of oil is decreased, the replenishing control valve is automatically opened, and oil is supplied to the water-cooled engine 23 by gravity from the oil (lubricant) tank 34.

A muffler 36, an exhaust silencer 37, and a mist separator 38 are also connected to the water-cooled engine 23 via an exhaust pipe 35. Exhaust from the water-cooled engine 23 is cooled while flowing through the muffler 36 and the exhaust silencer 37, thereby generating drain water with acidic material separated from exhaust gas. Also, in the mist separator 38, drain water with acidic material is separated from exhaust gas. The above drain waters are fed to a drain neutralizer 40 via respective pipes 39, in which the drain water is neutralized, thereby being discharged. The engine unit 2 is provided with a heater 41 which controls the temperature of oil in an oil pan in the water-cooled engine 23.

The compressor system unit 3 has two compressors A and B, both of which are connected to a drive shaft 44 of the water-cooled engine 23 via respective electromagnetic clutches 43. These electromagnetic clutches 43 can be engaged or disengaged using clutch drive members (not shown). Referential numeral 45 is a heater for controlling the temperature of oil in the compressors A and B, and is activated at start-up at a low temperature.

The refrigerant circulation line 6 permits refrigerant to be compressed, circulated, vaporized, and liquefied, thereby performing heat-pumping. The refrigerant circulation line 6 is constituted by a basal circulation line 47 from the compressors A and B of the compressor system unit 3 to a four-way valve 46; an inside circulation line 48 accommodated in the inside unit 22; and an outside circulation line 49

9 sed between the basal circulation line 47 and the inside lation line 48.

le basal circulation line 47 is constituted by a discharge lation line 50 connected to the compressors A and B on ischarging side and communicated to a first port 46a of our-way valve 46, and a intake circulation line 51 ected to the compressors A and B on the intake side and nunicated to a second port 46b of the four-way valve he discharge circulation line 50 is provided with an oil ator 52 having a heater 53 that controls the temperature e oil separator 52. The oil separator 52 permits oil to n to a line upstream of a subaccumulator 56 through a lary tube 55 via a strainer 54, and also to return to a line eam of an accumulator 58 via an electromagnetic valve he electromagnetic valve 57 opens normally at start-up oil abundantly discharged from the compressors A and cumulates in the oil separator 52; otherwise, the valve closed.

le subaccumulator 56 and the accumulator 58 are pro-l in the intake circulation line 51. The accumulator 58 mmodates both liquid and vapor refrigerant therein. The r refrigerant is transferred to the subaccumulator 56 via 51c through a capillary tube 60, and via lines 51d, 51e, 51f, and further via the lines 51d, 51e, and 51f through liner 61 and a capillary tube 62. The liquid refrigerant mmodated in the accumulator 58 is transferred to the ccumulator 56 via the lines 51d, 51e, and 51f through a ler 63 and a capillary tube 64. A heater 59 controls the erature at the capillary tubes 62 and 64, and the lers 61 and 63. Each of the strainers 61 and 63 is lded with a temperature sensor for sensing the low-erature liquid refrigerant passing through the respective lers, thereby detecting whether or not the surface of the l refrigerant is located between the strainers 61 and 63. ldition, the oil accommodated in the accumulator 58 is ferred from the lower part of the accumulator 58 to the ccumulator 56 via a line 51g through a strainer 77 and itrol valve 78 or an orifice 79, and via the lines 51e and le subaccumulator 56 is provided with a heater 56 that ols the temperature of the subaccumulator 56. The r refrigerant in the subaccumulator 56 is introduced into compressors A and B via lines 51h and 51i through ctive one-way valves. The oil accommodated in the ccumulator 56 is slowly taken into the compressors A 3 via an orifice 66. The discharge circulation line 50 is ected to the intake circulation line 51 via a strainer 68 in electromagnetic valve 69 that open when the pressure egularly high, thereby preventing the occurrence of ularly high pressure.

third port 46c of the four-way valve 46 is connected to 49a which constitutes the outside circulation line 49, which includes an outside heat-exchanger 70. A heat-anger 72, a strainer 73, a line 49b provided with a ial valve 74, a joint (coupler) 75, and an electrical nsion valve 76 are provided between the outside heat-anger 70 and inside heat-exchangers 71 included in the e circulation line 48.

le inside heat-exchangers 71 are connected to the inside lation line 48, and is communicated to a fourth port 46d le four-way valve 46 positioned between the basal lation line 47 and the outside circulation line 48 via a (coupler) 80, a line 49c constituting the outside circu-l line 49, and a manual valve 81 positioned therebe-n.

le intake circulation line 51 is connected to a line 49b tituting the outside circulation line 49 via a flow control

10 valve 90e and a strainer 91e, and the discharge circulation line 50 is connected to the line 49b via a strainer 92, an electromagnetic valve 93, and a capillary tube 94.

The hot water line 5 comprises a heat-exchanger 82 provided in the water-cooled engine 23 that is a heat source of hot water, and a heat-exchanger 99 provided in a muffler 36, in which hot water is circulated by pumps 86 and 87 through a switch valve 83 having a thermostat, a three-way valve 84, a radiator 85, the pump 86, the heat-exchanger 99, and the pump 87, in sequence. The radiator 85 is provided with cooling fan 96. The air and water vapor are returned to a conduction assembly (water-pouring hole cap) 98 through the switch valve 83, and then discharged to the atmosphere through the conduction assembly 98. A recovery tank (cooling water replenishing tank) 89 for supplying cooling water is connected to the conduction assembly 89, and the cooling water is supplied between the radiator 85 and the pump 86 via a cooling water pipe 97 from the conduction assembly 98.

At start-up, hot water is circulated using the pump 87 in a loop via the heat-exchanger 82 by manipulating the switch valve 83 until the temperature of the hot water reaches a given level.

Hot water is fed to the heat-exchanger 88 positioned in the accumulator 58 by manipulating the three-way valve 84, thereby promoting vaporization of liquid refrigerant accommodated in the accumulator 58.

Thus, when operating the air-conditioning system 1 having the above structures for cooling a room, as shown in FIG. 2, the four-way valve 46 is controlled in such a way as to connect the first port 46a and the third port 46c, and concurrently the fourth port 46d and the second port 46b.

Accordingly, refrigerant is compressed by the compressors A and B driven by the water-cooled engine 23, whereby the generated high-temperature high-pressure vaporized refrigerant is cooled by the outside air so as to be liquefied in the outside heat-exchanger 70 of the outside unit 21. The liquefied refrigerant is decompressed (subjected to pressure reduction) by the function of the expansion valve 76, and the refrigerant under low pressure is vaporized in the inside heat-exchangers 71 of the inside unit 22, while absorbing heat from the inside air. The heat of evaporation drives the cooling effect to cool the room. The evaporated refrigerant is returned to the compressors A and B, and the same cycle is repeated. Hot water, which circulates through a hot water heat-exchanger 88 via the three-way valve 84 from the hot water circulation line 5, supplies heat energy to liquid refrigerant in order to compensate for insufficient vaporization at the inside heat-exchanger 71, as well as to facilitate driving power of the compressors A and B.

When operating the air-conditioning system 1 for heating a room, as shown in FIG. 3, the four-way valve 46 is controlled in such a way as to connect the first port 46a and the through port 46d, and concurrently the third port 46c and the second port 46b.

Accordingly, refrigerant is compressed by the compressors A and B driven by the water-cooled engine 23, whereby the generated high-temperature high-pressure vaporized refrigerant is cooled by the outside air so as to be liquefied in the inside heat-exchangers 71 of the inside unit 22. In this process, the refrigerant radiates heat towards the inside air due to the heat of radiation so as to heat the room. The liquefied refrigerant is decompressed (subjected to pressure reduction) by the function of the expansion valve 76, and the refrigerant under low pressure is vaporized while absorbing heat from the outside air in the outside heat-exchanger 70 of the outside unit 21. The liquid refrigerant is separated in the accumulator 58, and the vapor refrigerant is returned to the compressors A and B, and the same cycle is repeated. Hot water, which circulates through a hot water heat-exchanger 88 via the three-way valve 84 from the hot water circulation line 5, supplies heat energy to liquid refrigerant in order to compensate for insufficient vaporization at the outside heat-exchanger 70, as well as to facilitate driving power of the compressors A and B.

The compressor system unit 3 of the air-conditioning apparatus 1 will be explained with reference to FIGS. 4-8.

Compressor System Unit

The compressor system unit 3 of the air-conditioning apparatus 1 comprises two multi-blade type compressors A and B which are driven by the water-cooled engine 23. The structures of one of the compressors, compressor A, are explained with reference to FIGS. 5-8. The structures of compressor B are the same as compressor A, and thus explanation of compressor B is omitted.

The compressor system unit 3 has a rotor housing 100, one side of which is affixed to a compressor casing 200 with clamping bolts (fasteners) 201. To the other side of the rotor housing 100, caps 300 to compressor A and B, respectively, are affixed with clamping bolts (fasteners) 301.

Figure 5:
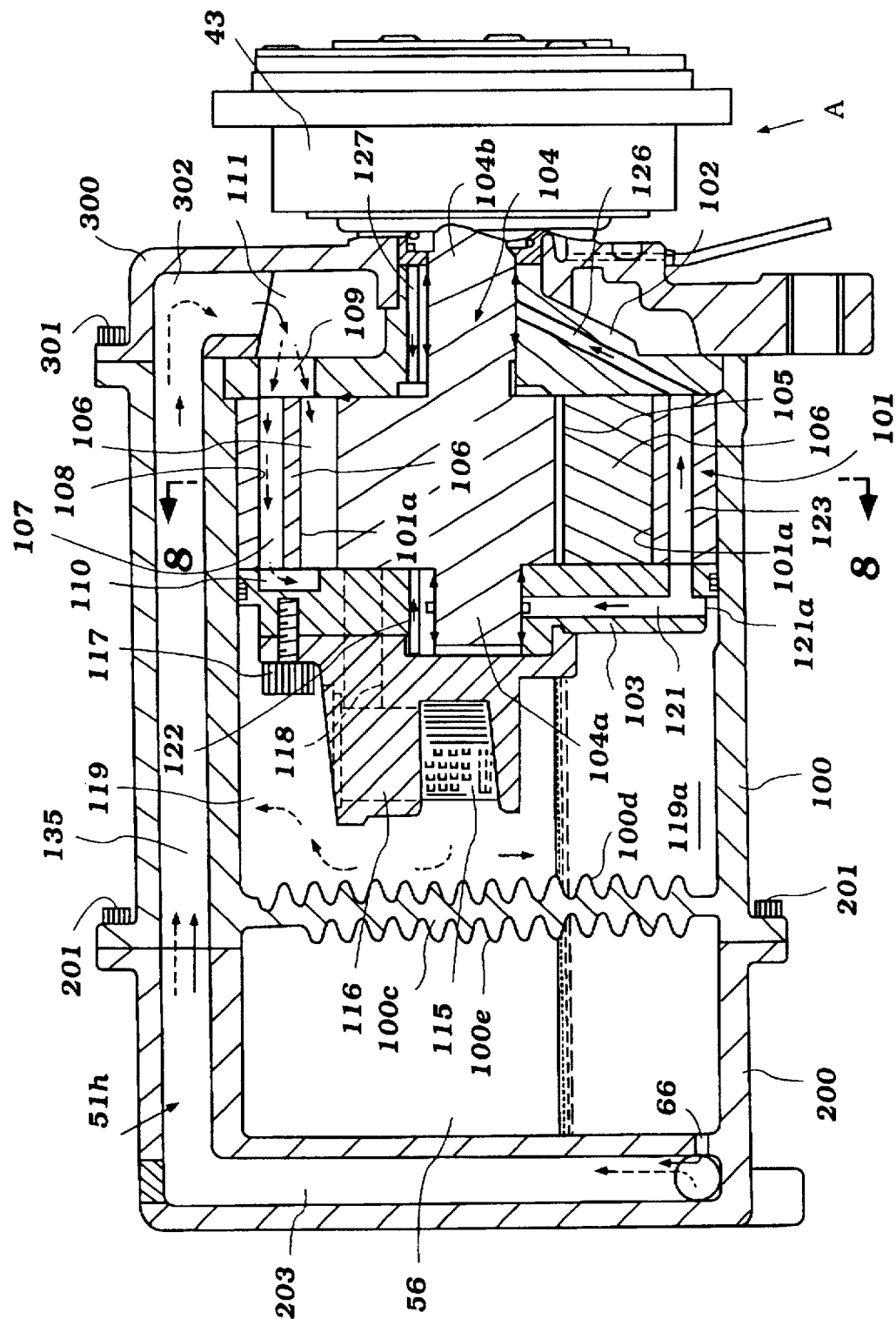
FIG. 5 is a schematic cross-sectional view of the compressor system of FIG. 4, which is cross-sectioned along the V—V line.
Figure 8:
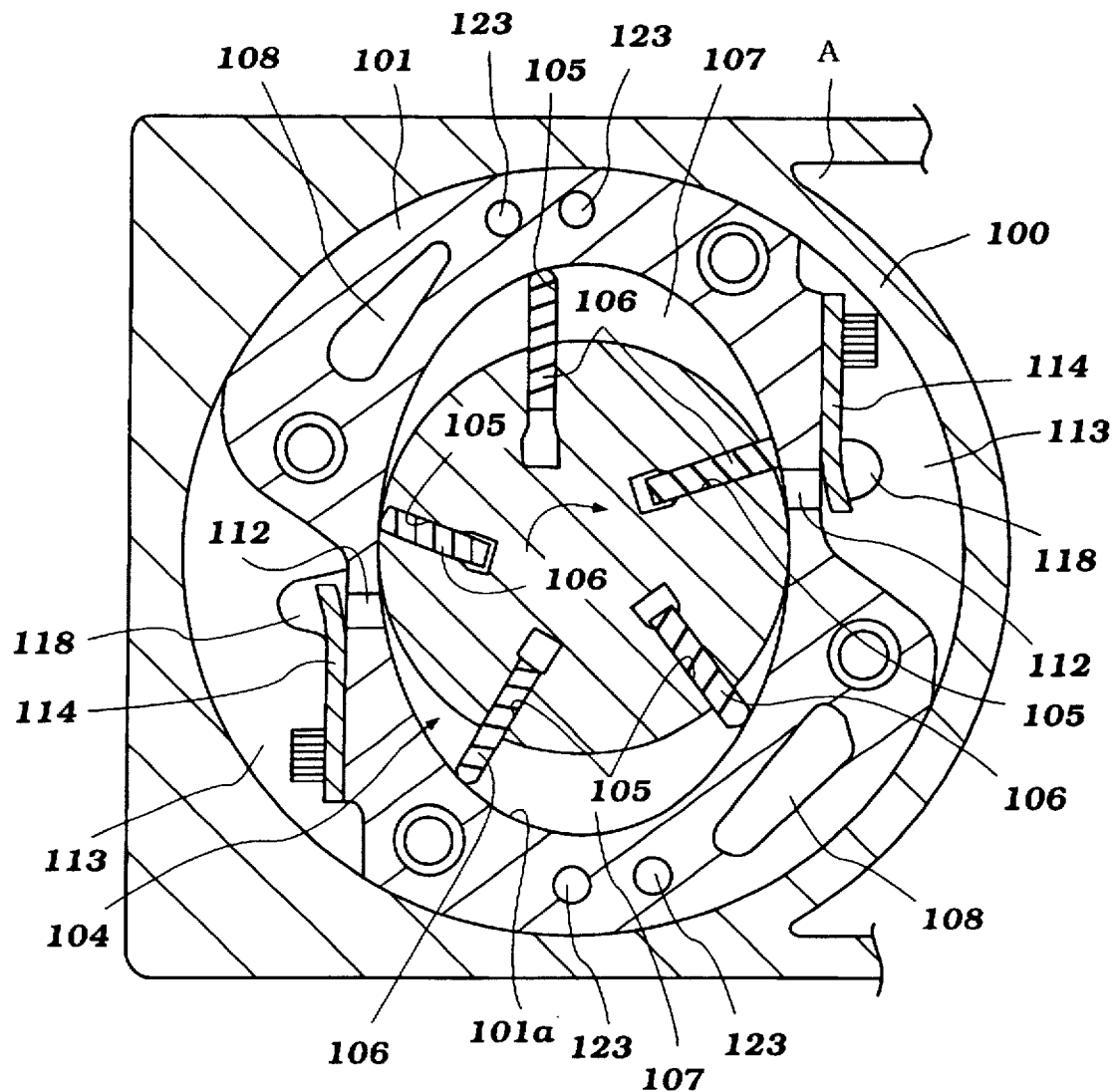
FIG. 8 is a schematic cross-sectional view of the compressor system of FIG. 4, which is cross-sectioned along the VIII—VIII line.

As shown in FIG. 5, in the rotor housing 100, a cylinder 101 is accommodated, and side blocks 102 and 103 are attached to respective ends of the cylinder 101. Also, in the cylinder 101, shafts 104a and 104b of a rotor 104 are pivoted to the side blocks 103 and 102 so as to make it freely rotatable. The rotor 104 has a main portion which has a large diameter and which is positioned between the shafts 104a and 104b in the cylinder 101. As shown in FIG. 8, the main portion has structures having five vane-sliding slots 105, each formed approximately in a radial direction. Into each sliding groove, a vane 106 is fitted in such a way as to freely slide in a radial direction, and when the rotor 104 rotates in the direction indicated by the arrow, each vane 106 revolves while the outer end of the blade slides upon the inner wall of a bore 101a having an elliptical cross-section. In the cylinder 101, five compartments (pumping chambers) 107 for induction and compression of refrigerant are defined by the rotor 104.

The cylinder 101 is provided with a pair of induction conduits 108 which go through the cylinder 101 in the axis direction. Induction inlets 109 and 110, which are communicated to the induction and compression compartment 107, are formed in the side blocks 102 and 103, respectively (FIG. 5). The induction inlet 109 is communicated directly to the induction channel 111, and the induction inlet 110 is communicated to the induction channel 111 via the induction conduit 108. The induction channel 111 is formed between the side block 102 and the cap 300. As shown in FIG. 8, two discharge outlets 112, which are openings communicating to the induction and compression compartments 107, are formed, and each discharge outlet 112 is provided with a valve 114 which allows vapor refrigerant to flow from the induction and compression compartment 107 to a discharge compartment 113.

As shown in FIG. 5, a holder 116 having an oil separator 115 the side block 103 with a hexagon socket head cap screw 117. The discharge compartment 113, which is formed by the side blocks 102 and 103, the rotor housing 100, and the cylinder 101, is communicated to the oil separator 115 via discharge conduit 118 that is an opening communicating to the discharge compartment 113. An oil reservoir (oil storage chamber) 119 wherein oil is stored in the lower part is formed behind the cylinder 101 in the rotor housing 100, in which lubricating oil 119a is stored. There is an opening, a discharge outlet 120, in the upper part of the rotor housing 100 above the oil reservoir 119, and the discharge outlet 120 is communicated to the discharge circulation line 50 (FIG. 7).

The oil reservoir 119 is also used as a high-pressure refrigerant chamber, and accommodates lubricating oil therein. There is an opening, an oil inlet 121a, in the lower part of the oil reservoir 119. The oil inlet 121a is communicated to an oil circulation conduit 121 formed in the side block 102. The oil circulation conduit 121 is led to the shaft unit 104a of the rotor 104 so as to supply lubricating oil, thereby lubricating the shaft unit. The side block 102 is also provided with an oil circulation conduit 122 which is communicated to the shaft unit 104a of the rotor 104. The lubricating oil, which has lubricated the shaft unit 104a, is then moved from the oil circulation conduit 122 to a gap between the side block 102 and the rotor 104, thereby lubricating therebetween (FIG. 5). Four oil circulation conduits 123 are formed in the cylinder 101. The oil circulation conduits 123 are communicated to the oil circulation conduit 121 of the side block 103. The side block 102 is provided with oil circulation conduits 126 and 127. The oil circulation conduit 126 is led to the shaft unit 104b of the rotor 104 via the oil circulation conduits 123 of the cylinder 101, thereby lubricating the shaft unit 104b. The oil circulation conduit 127 is communicated to the shaft unit 104b of the rotor 104, and the lubricating oil, which has lubricated the shaft unit 104b, is then moved to a gap between the side block 102 and the rotor 104 from the oil circulation conduit 127, thereby lubricating therebetween, and is led to the induction and compression compartment 107.

Figure 7:
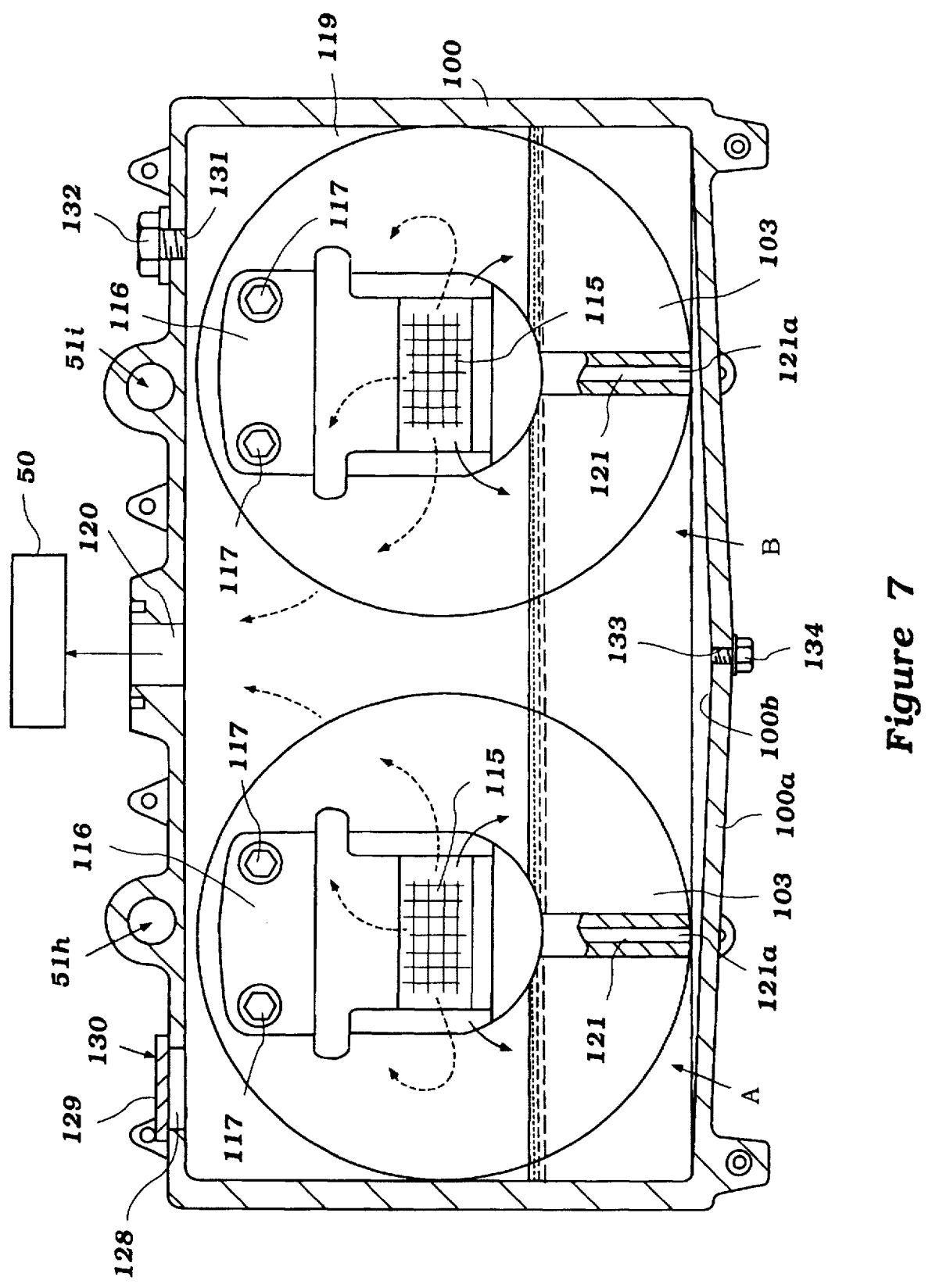

At the upper part of the rotor housing 100, an observation port 130 is provided by sealing an opening 128 with a transparent glass 129 (FIG. 7). An oil charging hole 131 is provided on the side opposite to the observation port 130. An oil charging hole cap (bolt) 132 is removed from the oil injection inlet 131, and oil is injected thereto. The bottom 100a of the rotor housing 100 is slanted so that the center 100b of the bottom 100a is made lower than the sides, whereby lubricating oil drainage can be accumulated therein. The center 100b of the bottom 100a is provided with an oil drain hole 133, through which lubricating oil is discharged and replaced, or drained at a certain time after removing a drain hole cap (bolt) 134.

The rotor housing 100 is attached to the compressor casing 200 with clamping bolts 201, and the oil reservoir 119 for accommodating lubricating oil therein and the subaccumulator 56 are contiguous to each other, in which a heat-exchange wall 100c formed in the rotor housing 100 is interposed therebetween (FIG. 5). The heat-exchange wall 100c is provided with fins 100d on the side of the oil reservoir 119, and also provided with fins 100e on the side of the subaccumulator 56, thereby enlarging the heat-exchanging area, and improving heat exchange efficiency.

Figure 4:
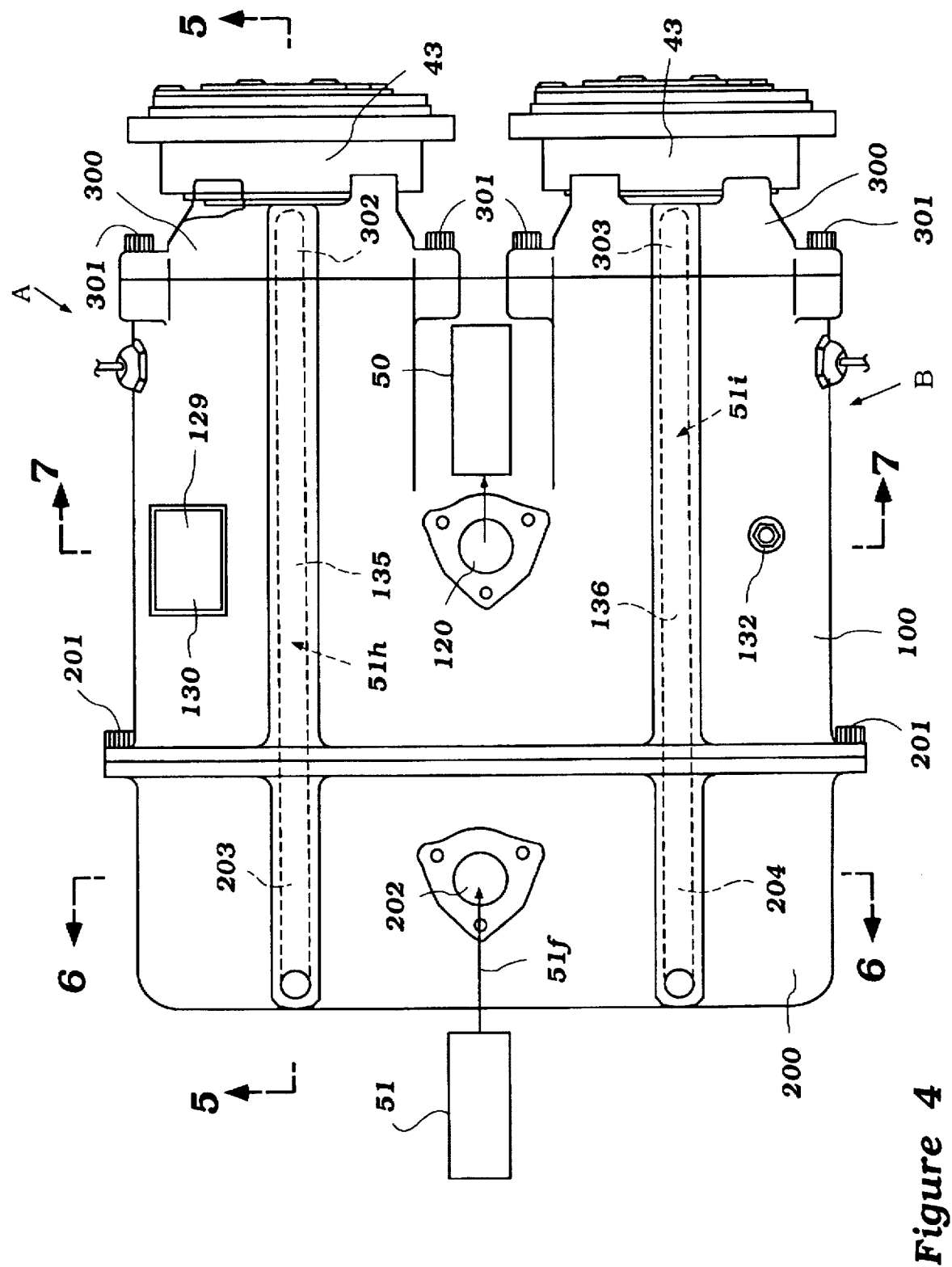
FIG. 4 is a schematic plane view illustrating a compressor system usable in the present invention.
Figure 6:
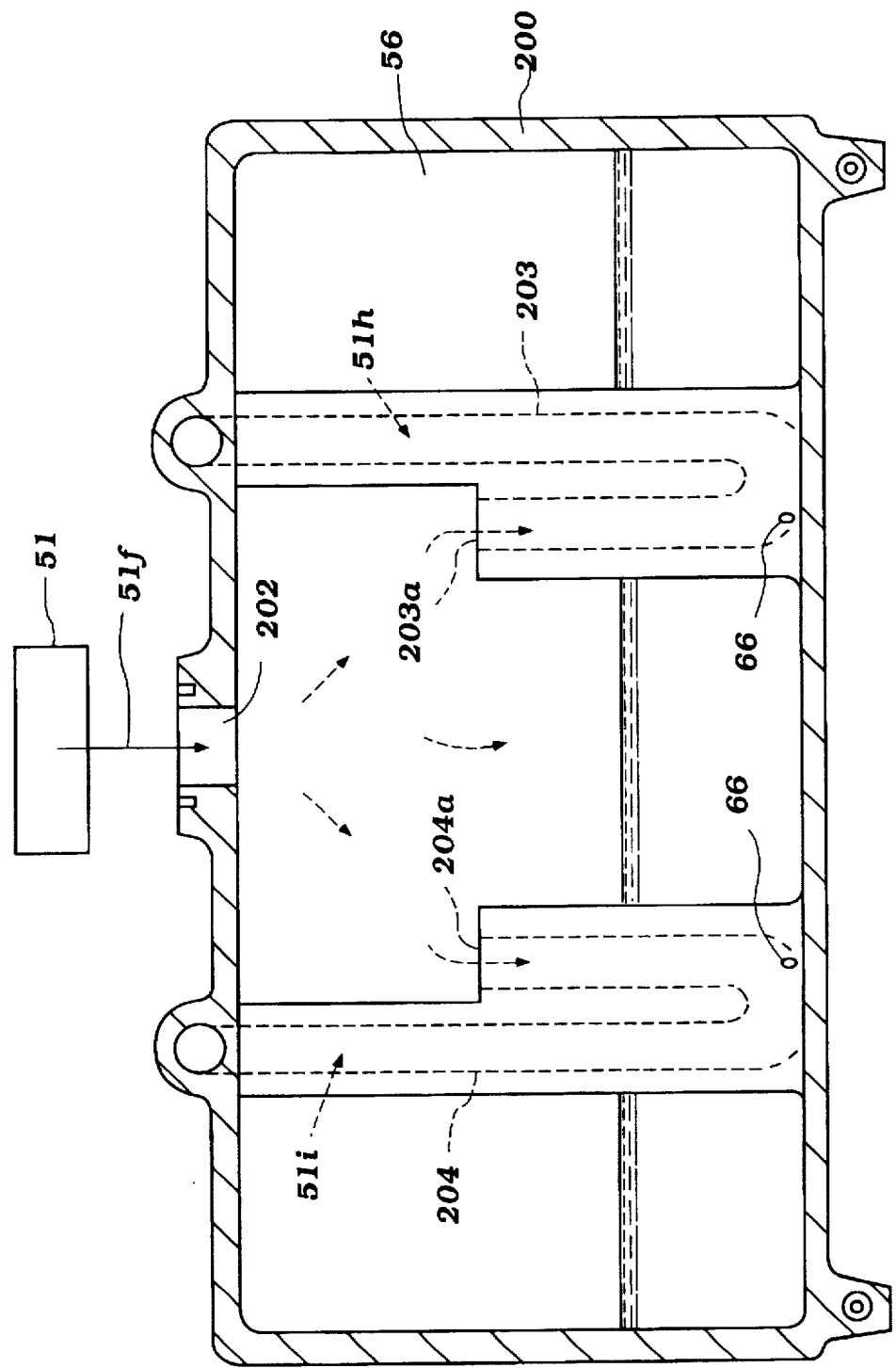
FIG. 6 is a schematic cross-sectional view of the compressor system of FIG. 4, which is cross-sectioned along the VI—VI line.

The subaccumulator 56 is a low pressure chamber, and the upper part of the subaccumulator 56 is provided with an opening, an induction inlet 202, connected to a circulation line 51f of the intake circulation line 51 (FIGS. 4 and 6). A pair of conduits 203 and 204 are formed from the side to the upper part of the compressor casing 200, and the conduits 203 and 204 are communicated to conduits 135 and 136, respectively, formed in the upper part of the rotor housing 100. The conduits 135 and 136 are communicated to conduits 302 and 303, respectively, formed in the cap 300. The conduits 302 and 303 are in turn communicated to the induction channel 111 (FIG. 5).

There are openings 203a and 204a in the middle of the subaccumulator 56, which are communicated to the conduits 203 and 204, respectively (FIG. 6). Through the openings 203a, and 204a, vapor refrigerant present in the subaccumulator 56 is taken by and introduced into the compressors A and B in operation, respectively. That is, by operation of the compressor A, vapor refrigerant present in the subaccumulator 56 is taken into the compressor A via the conduits 203, 135, and 302, and the induction channel 111, thereby forming a circulation line 51h (FIG. 5). On the other hands, by operation of the compressor B, vapor refrigerant present in the subaccumulator 56 is taken into the compressor B via the conduits 204, 136, and 303, and the induction channel 111, thereby forming a circulation line 51i.

The lubricating oil remaining in the subaccumulator 56 are slowly taken into the compressors A and B through an orifice 66.

Accordingly, by adjoining the oil reservoir 119 for accommodating lubricating oil and the subaccumulator 56 via the heat-exchange wall 100c interposed therebetween, and further by integrating the compressors A and B and the subaccumulator 56, it is possible to eliminate piping connecting the compressors A and B and the subaccumulator 56, reduce the production cost, and downsize the apparatus.

Further, by adjoining the oil reservoir 119 for accommodating lubricating oil and the subaccumulator 56 via the heat-exchange wall 100c interposed therebetween, lubricating oil present in the oil reservoir 119 is cooled by exchanging heat between the oil and the liquid refrigerant present in the subaccumulator 56, and it is possible to eliminate a specific radiator for cooling the lubricating oil, thus reducing the production cost. On the other hand, the refrigerant in the subaccumulator 56 is concurrently heated by the lubricating oil in the oil reservoir 119.

In brief, each rotor 104 of the compressors A and B is provided with an electromagnetic clutch 43 at the end of the rotor, and driving power generated by the water-cooled engine 23 is transmitted to the rotor 104 according to the ON/OFF operation of the electromagnetic clutch 43. When driving power is transmitted to the rotor 104 and the rotor 104 starts rotation, the vanes 106 revolves together. The vanes 106 slide upon the walls of the vane-sliding slots 105 in the outward direction, thereby revolving while the edges of the vanes 106 slide upon the wall of the bore 101a of the cylinder 101. Vapor refrigerant is taken into the compression compartment 107 in the cylinder 101 via the induction channel 111, the induction inlet 109, and the induction conduit 108. The vapor refrigerant is then compressed by the vanes 106, thus turning it into high-temperature high-pressure vapor refrigerant, which is discharged to the discharge compartments 113 via the discharge outlets 112 and the valves 114 (FIG. 8). The vapor refrigerant discharged to the discharge compartment 113 reaches the oil separator 115 via the discharge conduit 118, where the oil portion is separated therefrom, flows into the oil reservoir 119, and is finally discharged to the discharge circulation line 50 which is an outside system through the discharge outlet 120 (FIG. 7).

As explained above, the compressors A and B are provided with the conduits to circulate lubricating oil in the liquid refrigerant accommodated in the subaccumulator 56, thereby exchanging heat between the lubricating oil and the refrigerant. Thus, a special radiator for cooling lubricating oil can be eliminated, thereby reducing the production cost.

The lubricating oil, which has been separated from the liquid refrigerant by the oil separator 115, drips from the oil separator 115 and is accommodated in the lower part of the oil reservoir 119. The lubricating oil then flows from the oil inlet 121a towards the direction indicated by the arrow in FIG. 5 via the oil circulation conduits 121, 122, 126, and 127, and lubricates the shaft unit of the rotor 104, the gap between the rotor 104 and the side blocks 102 and 103, and the sliding area of the bore 101a and the vanes 106, especially the area under low pressure. The lubricating oil then moves to the pumping chamber 107 and further to the outlet conduit 118 and the oil separator 115, and drips to return to the oil reservoir 119 by dripping.

At start-up, the vapor refrigerant including lubricating oil, which has been liquefied inside the bore 101a and inside the conduits 51h and 51i located between the subaccumulator 56 and the compressors A and B, turns into foam, and is discharged to the discharge circulation line 50, i.e., outside the compressor system unit, via the discharge outlet 120 of the oil reservoir 119. The lubricating oil contained in vapor refrigerant, which is in the form of foam, is accommodated in the oil separator 52 in the discharge circulation line 50 (FIG. 2), and moves to the accumulator 58 via the electromagnetic valve 57 which opens after a given time elapses.

The lubricating oil accommodated at the bottom of the accumulator 58 returns through the lower part of the accumulator 58 to the subaccumulator 56 which is integrated with the compressors A and B via the conduit 58g, the strainer 77, the control valve 78, the orifice 79, the lines 51e and 51f.

The lubricating oil is slowly taken from the subaccumulator 56 to the compressors A and B through the orifice 66, moves into the bore 101a with vapor refrigerant, returns to the oil separator 115 via the discharge conduit 118, and drips from the oil separator 115 to return to the oil separator 52. After a given time elapses, the electromagnetic valve 57 closes, the circulation of the lubricating oil accommodated in the oil separator 52 via the electromagnetic valve 57 is discontinued. The lubricating oil accommodated in the oil separator 52 is slowly circulated via the capillary tube 55 during operation.

Refrigerant Flow Control System

Figure 9:
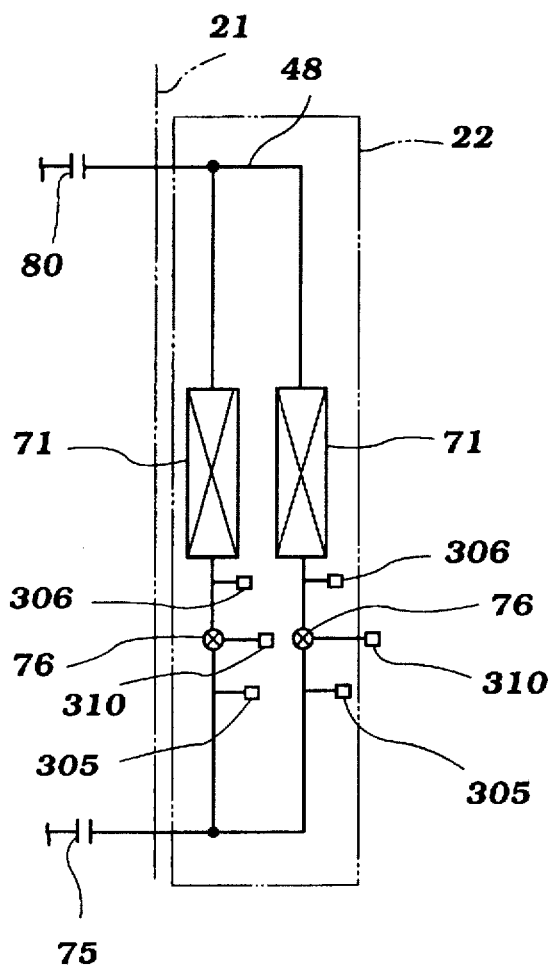
FIG. 9 is a schematic partial circuit illustrating structures of an inside heat-exchanger unit which replaces that of an engine-driven air conditioning apparatus of FIG. 2 or 3, according to a second embodiment of the present invention.
Figure 10:
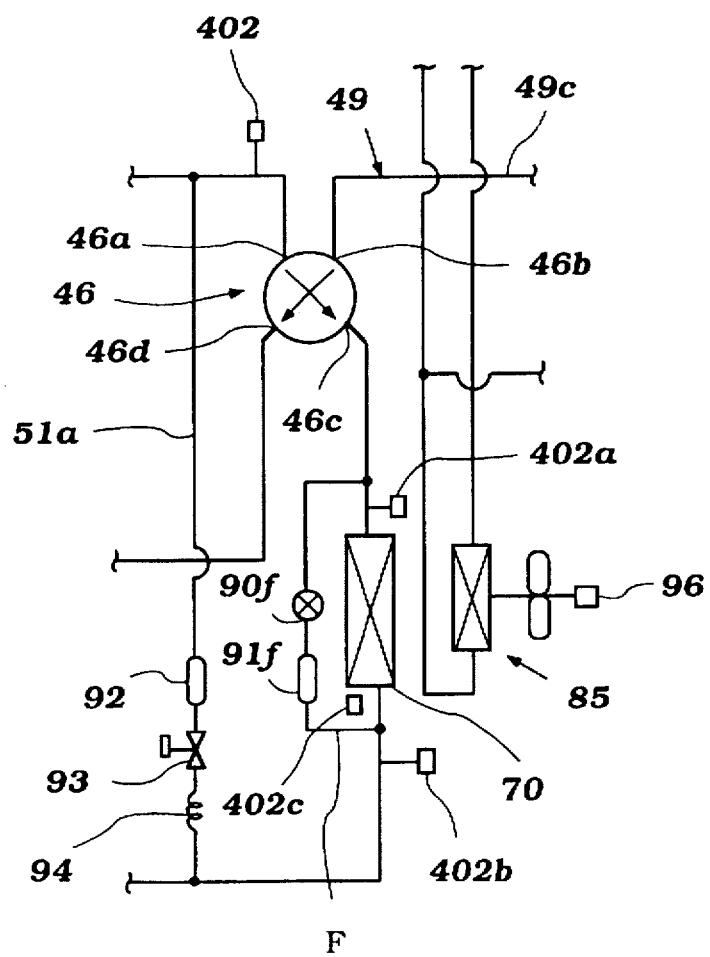
FIG. 10 is a schematic partial circuit illustrating structures of an area surrounding a four-way valve and an outside heat-exchanger, which replaces that of an engine-driven air conditioning apparatus of FIG. 2 or 3, according to a third embodiment of the present invention.
Figure 11:
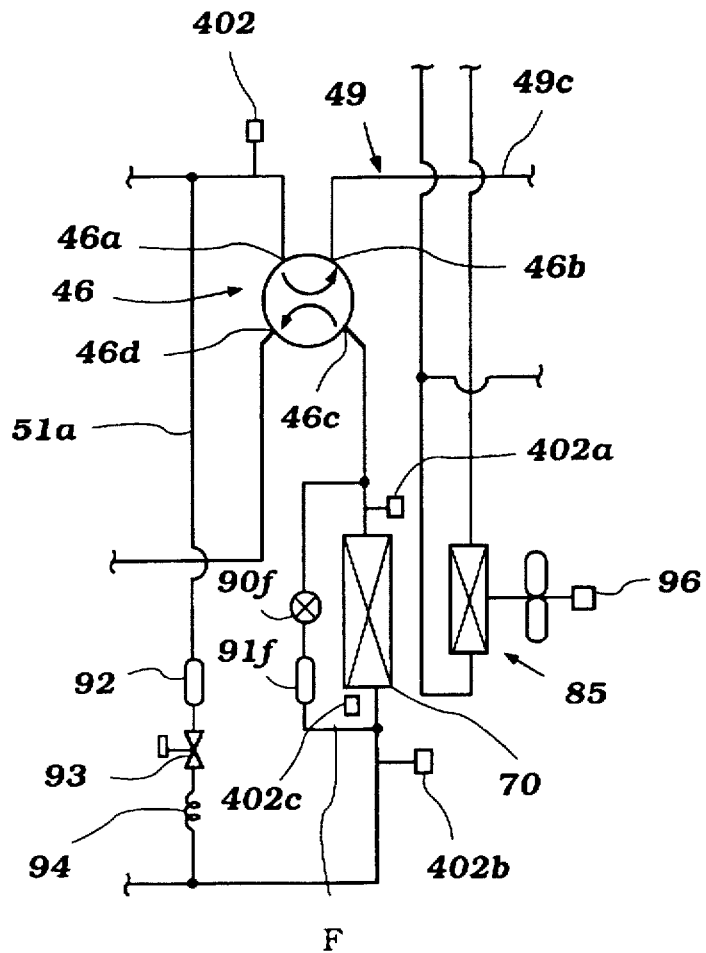
FIG. 11 is a schematic partial circuit illustrating structures of an area surrounding a four-way valve and an outside heat-exchanger (connecting ports of the four-way valve are different from those in FIG. 10) which replaces that of an engine-driven air conditioning apparatus of FIG. 2 or 3, according to a third embodiment of the present invention.
Figure 12:
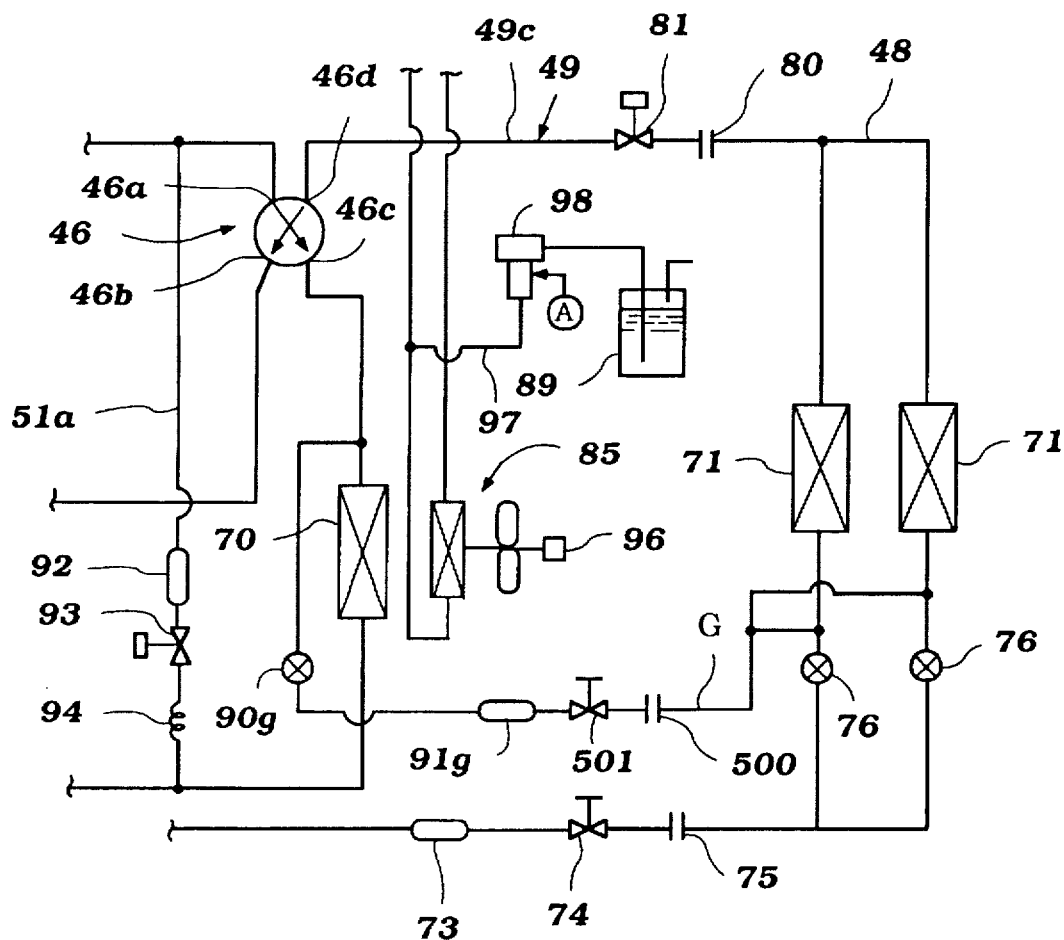
FIG. 12 is a schematic partial circuit illustrating structures of an area surrounding inside and outside heat-exchangers and a four-way valve, which replaces that of an engine-driven air conditioning apparatus of FIG. 2 or 3, according to a fourth embodiment of the present invention.
Figure 13:
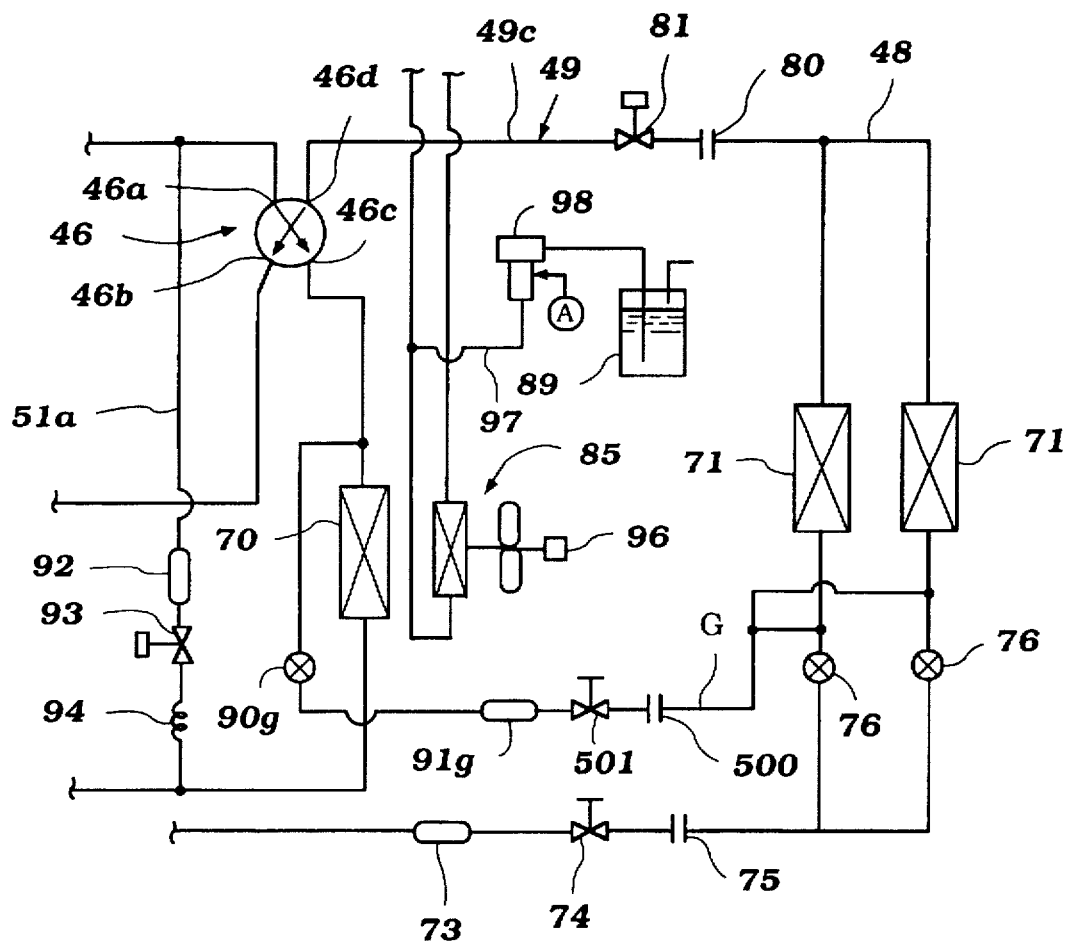
FIG. 13 is a schematic partial circuit illustrating structures of an area surrounding inside and outside heat-exchangers and a four-way valve (connecting ports of the four-way valve are different from those in FIG. 12), which replaces that of an engine-driven air conditioning apparatus of FIG. 2 or 3, according to a fourth embodiment of the present invention.

The air-conditioning apparatus shown in FIGS. 1–3, particularly in the heating mode shown in FIG. 3, represents a first embodiment of the present invention. FIG. 9 shows an inside unit 22a, a second embodiment of the present invention, replacing the inside unit 22 of the first embodiment. FIGS. 10 and 11 show a part of a refrigerant circulation line, a third embodiment of the present invention, replacing the corresponding part of the first embodiment. FIGS. 12 and 13 show a part of the system, a fourth embodiment of the present invention, replacing the corresponding part of the first embodiment.

FIG. 9 shows a schematic enlarged view of the inside unit 22a of the second embodiment. An expansion valve 76 used in the inside unit 22a is a linearly controlled expansion valve. A pressure sensor 306 for sensing high pressure when in the heating mode is provided in the line upstream of the expansion valve 76, and a pressure sensor 305 for sensing low pressure when in the heating mode is provided in the line downstream of the expansion valve 76. In addition, an expansion valve-opening sensor 310 for sensing the volume of refrigerant passing therethrough is provided in the expansion valve 76. When in the cooling mode, the pressure sensor 306 senses low pressure, and the pressure sensor 305 senses high pressure, since the refrigerant flow is reversed when the operation mode is switched.

FIGS. 10 and 11 show a schematic partial enlarged view of an outside circulation line 49a of the third embodiment of the present invention, in which FIGS. 10 and 11 show the outside circulation line in the cooling mode and in the heating mode, respectively. A bypass line F, which communicates the line upstream and downstream of the outside heat-exchanger 70 by bypassing the outside heat-exchanger 70, is provided. A linearly controlled valve 90f and a strainer 91f are provided in the bypass line F so that the volume of the refrigerant passing through the bypass line F can be controlled by adjusting the opening of the linearly controlled valve 90f. In FIG. 11 (the heating mode), temperature sensors 402b and 402a; are provided on the respective sides of (upstream and downstream of) the outside heat-exchanger 70. When in the heating mode, the temperature of the refrigerant upstream of the outside heat-exchanger 70 is measured using the temperature sensor 402b, while the temperature of the refrigerant downstream of the outside heat-exchanger 70 is measured using the temperature sensor 402a. In addition, a temperature sensor 402c for sensing the temperature of the refrigerant passing through the outside heat-exchanger 70 is provided. To detect the temperature of the refrigerant upstream of the inside heat-exchangers 71, a temperature sensor 402 is provided in the outside circulation line 49.

FIGS. 12 and 13 show a schematic enlarged view of an air-conditioning unit, the fourth embodiment of the present invention, replacing the corresponding part of the first embodiment, in which FIG. 12 shows the unit in the cooling mode and FIG. 13 shows the unit in the heating mode.

In FIG. 13 (in the heating mode), a bypass line G, which bypasses the expansion valve and the outside heat-exchangers 70, is provided between the line downstream of the inside heat-exchanger 71 and the line downstream of the outside heat-exchangers 70. The line of the bypass line G outside the room and the line inside the room are connected with a coupler 500, and a linearly controlled valve 90g, a strainer 91g, and a manual valve 501 are provided in the bypass line G.

Refrigerant Flow Control System against Pressure Loss

Figure 14:
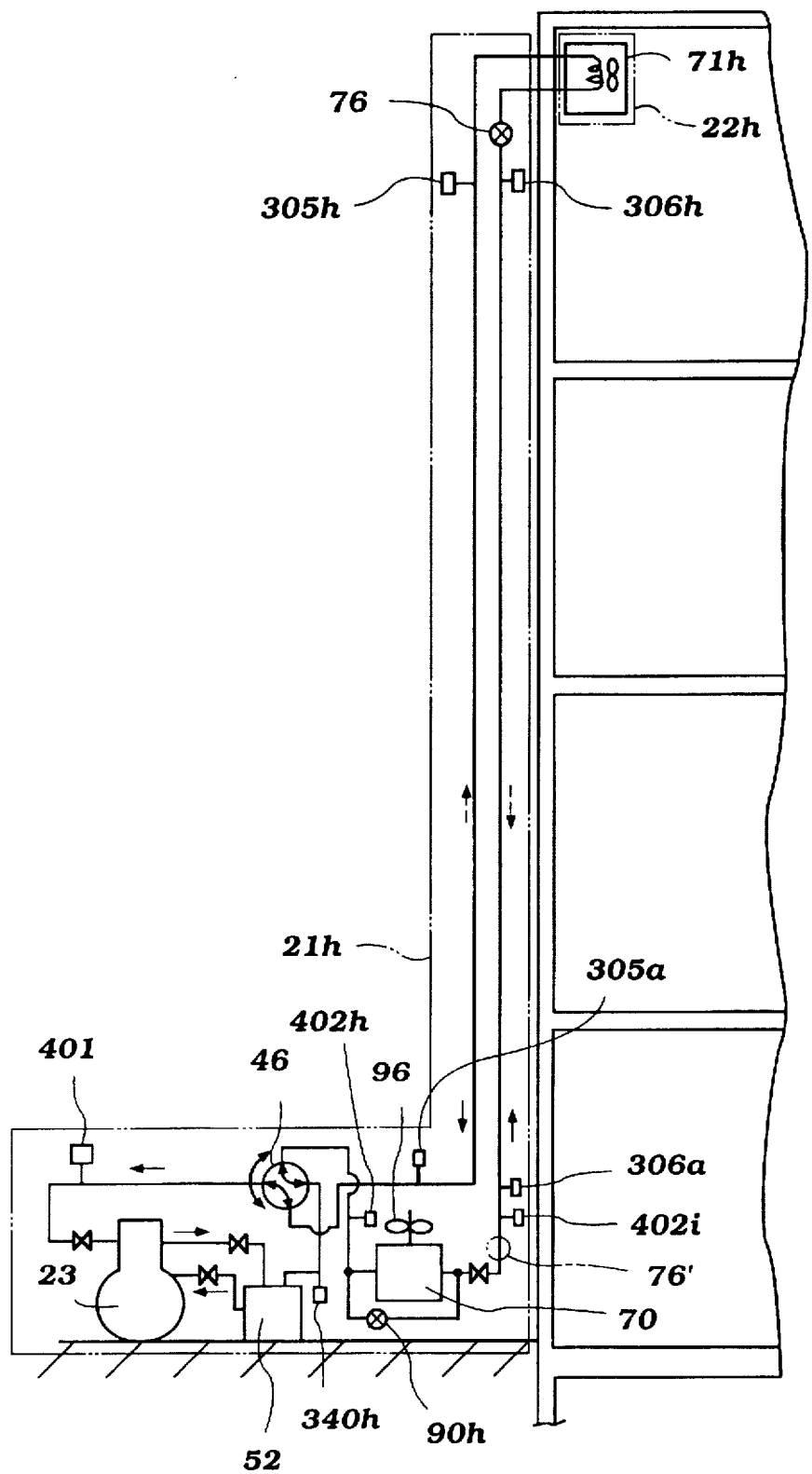
FIG. 14 is a schematic cross-sectional vertical view illustrating structures of an air-conditioning apparatus in the cooling mode, according to the present invention, in which an inside unit is placed on the fourth floor.
Figure 15:
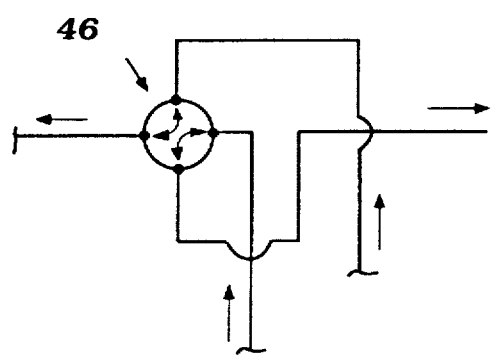
FIG. 15 is a schematic partial circuit around the four-way valve of the air-conditioning apparatus in the heating mode indicated in FIG. 14.

FIG. 14 shows an air-conditioning apparatus in the cooling mode, a fifth embodiment of the present invention. FIG. 15 shows a circuit around a four-way valve in the heating mode of the fifth embodiment.

The air-conditioning apparatus in FIG. 14 is in the cooling mode, and has an inside unit including an evaporator placed on the fourth floor. When in the heating mode, the four-way valve is set as shown in FIG. 15. An outside unit 21 is placed on the ground while an inside unit 22 is placed on a floor higher than the second floor (the fourth floor in the figure), and an expansion valve 76 is located in the vicinity of the inside unit 22. In this structure, since the outside unit 21 is placed on the ground, and an expansion valve 76 is located at a high altitude in the vicinity of the inside unit 22, in the heating mode, the pressure of the refrigerant discharged from the compressor 23 in the high pressure refrigerant line downstream of the four-way valve 46 and upstream of the expansion valve 76 decreases at a position immediately upstream of the expansion valve 76 due to the head difference between the compressor and the expansion valve. Further, since the expansion valve 76 is located apart from the compressor 23, pressure loss in the piping occurs, resulting in a further decrease in pressure immediately upstream of the expansion valve 76 in the high pressure refrigerant line. As a result, the difference between the upstream pressure and the downstream pressure of the expansion valve 76 becomes small, leading to a decrease in the amount of the refrigerant passing through the expansion valve 76, thereby reducing the cooling capacity of the inside unit 22.

In the heating mode, the amount of the refrigerant passing through the expansion valve 76 is determined in such a way that: (a) the greater the difference between the pressure measured by a pressure sensor 305 and the pressure measured by a pressure sensor 305a, which constitute high pressure sensing means; (b) the greater the difference between the pressure measured by the pressure sensor 305 and the pressure measured by a pressure sensor 306 constituting low pressure sensing means, wherein the pressure sensor 305 and 306 are provided in the vicinity of the expansion valve and substantially at the same altitude; or (c) the lower the pressure measured by the pressure sensor 306, the smaller the amount of the refrigerant passing through the expansion valve 76 located at a high altitude becomes. In addition, by the above measurement, the decrease in the amount of the refrigerant passing through the expansion valve 76 due to pressure loss in lengthy piping in the refrigerant line from the inside heat-exchanger 71 functioning as a condenser through the expansion valve 76, can also be detected.

Further, the greater the difference between the pressures measured by the respective pressure sensors 306 and 306a constituting low pressure sensing means, the lower the discharge pressure of the compressor as well as the smaller the amount of the refrigerant discharging from the compressor become, resulting in an increase in the radiation area per refrigerant weight/time. When the amount of the condensed refrigerant increases, the pressure after passing through the condenser decreases. Thus, the decrease in the amount of the refrigerant passing through the expansion valve 76 is determined in such a way that the greater the difference between the pressures measured by the respective pressure sensors 306 and 306a, the greater the decrease in the amount becomes. That is, the decrease in the amount of the refrigerant passing through the expansion valve 76 due to pressure loss in lengthy piping in the refrigerant circulation line from the expansion valve 76 through the four-way valve 46 can be detected.

The temperature of the refrigerant in the heating mode is measured by a temperature sensor 402i, and the temperature of the refrigerant in the cooling mode is measured by a temperature sensor 402h. In the heating mode, the pressure sensors 305a and 305h are used for high pressure, while the pressure sensors 306h and 306a are used for low pressure.

Heat Capacity Control System

In the present invention, as one embodiment of the energy-supplying mechanism for exerting energy onto the refrigerant, as shown in FIG. 3, the accumulator 58 is installed between the evaporator, i.e., the outside heat-exchangers 70, and the compressors A and B. In the accumulator 58, the hot water heat-exchanger 88 is provided to exert heat onto the refrigerant by utilizing exhaust heat from the engine.

As another embodiment of the energy-supplying mechanism for exerting energy onto the refrigerant, electrical heat is provided. As shown in FIG. 3, the heater 53, the heater 59, and the heater 65 are provided in the oil separator 52, the accumulator 58, and the subaccumulator 56, respectively.

As another embodiment of the energy-supplying mechanism for exerting energy onto the refrigerant, a heat-exchanging unit is provided to exchange heat between the refrigerant and the water-cooled engine 23 or the compressors A and B. As shown in FIGS. 4–8, the heat-exchanging mechanism is employed in the oil reservoir 119 for accommodating lubricating oil, i.e., the oil reservoir 119 and the subaccumulator 56 are adjoined with the heat-exchanging wall 100c interposed therebetween. Frictional heat, which increases in accordance with an increase in the rpm's of the compressors A and B, can be exerted onto the refrigerant.

In the above, stabilization of air-conditioning operation by compensating for insufficient endothermic heat capacity can be achieved in such a way that the greater the difference between the radiation heat capacity and the endothermic heat capacity, i.e., the lower the outside temperature when in the heating mode, the higher the volume of hot water becomes, the higher the intensity of electric current passing through the heater becomes, or the higher the rpm's of the engine becomes. The radiation heat capacity is the capacity of the condenser, i.e., the inside heat-exchangers 71 when in the heating mode, and the endothermic heat capacity is the capacity of the evaporator, i.e., the outside heat-exchanger 70 when in the heating mode.

Figure 16:
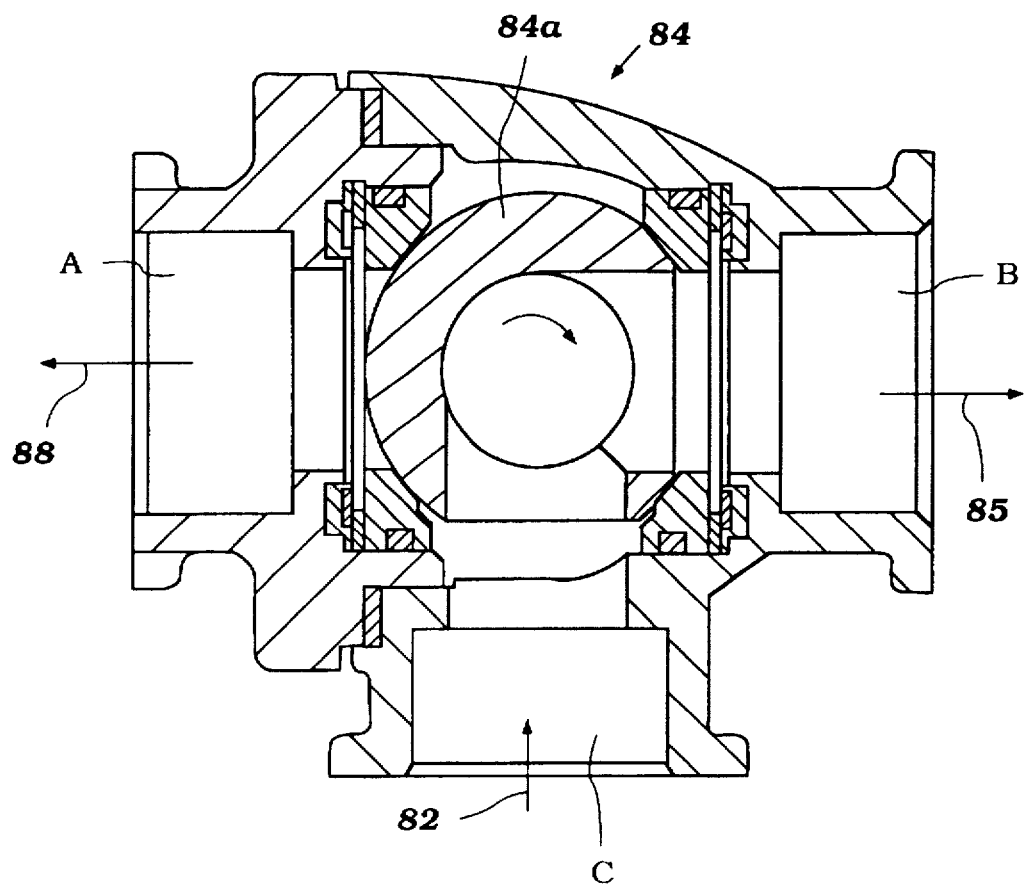
FIG. 16 is a schematic cross-sectional view illustrating structures of a three-way valve usable in the present invention, in which ports B and C are communicated.
Figure 17:
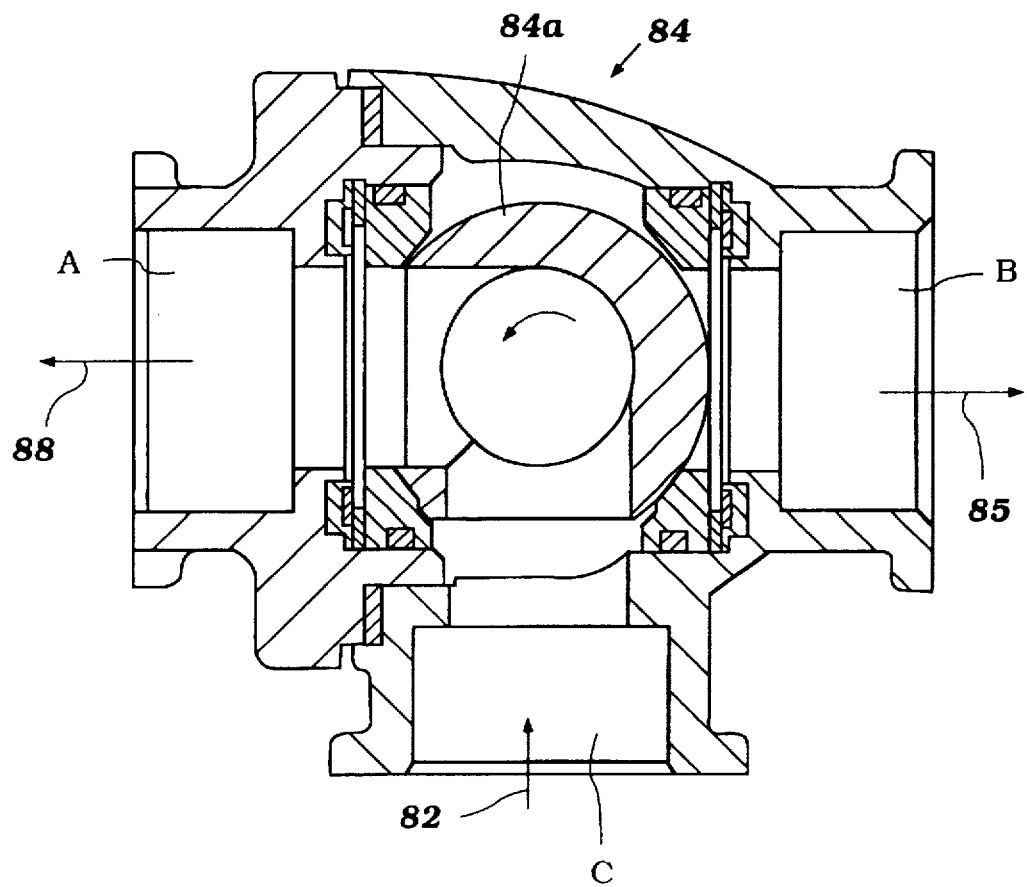
FIG. 17 is a schematic cross-sectional view illustrating structures of the three-way valve of FIG. 16, in which ports A and C are communicated.
Figure 18:
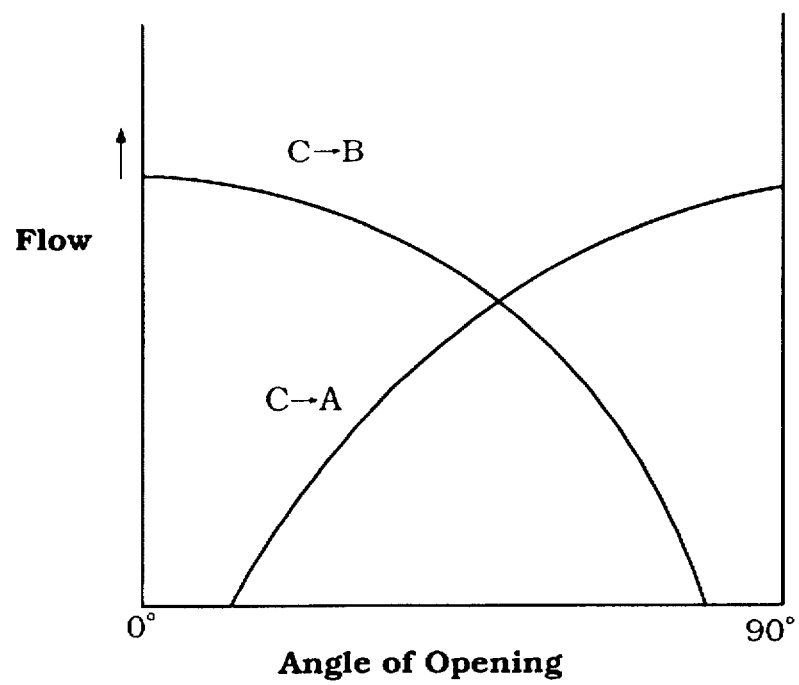
FIG. 18 is a schematic graph showing the relationship between the flow and the opening angle of valves of a three-way valve usable in the present invention.

For example, as shown in FIGS. 16 and 17, when the three-way valve 84 provided in the hot water circulation line 5 is a linearly controlled valve, a port A is communicated to the line connecting to the hot water heat-exchanger 88 in the accumulator 58, a port B is communicated to the line connecting to the radiator 85 of the outside unit 21, and a port C is communicated to the line connecting to the heat-exchanger 82 of the water-cooled engine 23. The opening of each port is controlled by rotating a rotary valve shaft 84a, thereby controlling the volume and the route of hot water flow (FIG. 18).

When in the heating mode, the greater the difference between the radiation heat capacity of the condenser (the inside heat-exchangers 71) and the endothermic heat capacity of the evaporator (the outside heat-exchanger 70), the more the rotary valve shaft 84a is rotated in such a way as to increase the flow of hot water from the port C to the port B, i.e., supplying hot water to the heat-exchanger 85 positioned near the outside heat-exchanger 70, thereby exerting heat onto the refrigerant passing through the outside heat-exchanger 70 functioning as an evaporator.

As described above, by (1) exerting heat onto the refrigerant; (2) discontinuing operation of a fan motor 96 at the outside unit 21; or (3) discontinuing operation of a fan motor at the inside unit 22, in such a way as to increase the difference in pressure between the high pressure side and the low pressure side, it is possible to compensate for insufficient endothermic heat capacity.

Heat Capacity Control System based on Flow Control

In addition, the heat capacity control can be achieved by: (1) as shown in FIG. 13, enlarging or controlling the opening of a linearly controlled valve 90g provided in the bypass line G which bypasses the expansion valve 76 and the evaporator (the outside heat-exchangers 70) and communicates the refrigerant circulation line downstream of the inside heat-exchanger 71 and that downstream of the outside heat-exchangers 70; or (2) as shown in FIG. 3 or 11, enlarging or controlling the opening of a linearly controlled valve 90e or 90f, provided in the bypass line E or F which bypasses the evaporator (the outside heat-exchanger 70) and communicates the refrigerant circulation line upstream of the outside heat-exchanger 70 and that downstream of the outside heat-exchanger 70.

Accordingly, it is possible to control and reduce the flow ratio of the refrigerant passing through the inside heat-exchangers 71 (condenser) to the refrigerant passing through the outside heat-exchanger 70 (evaporator). The above bypass lines E, F, and G and valves 90e, 90f, and 90g function as a flow controlling mechanism.

Heat Capacity and Refrigerant Flow Sensing System

As one embodiment of a sensing means for sensing the refrigerant flow passing through the expansion valve, as shown in FIG. 3, the pressure sensor 390 for sensing high pressure is provided in the refrigerant circulation line on the high pressure side between the compressors A and B and the expansion valve 76. Further, as shown in FIG. 9, the pressure sensors 306 for sensing high pressure (when in the heating mode) is provided in the refrigerant circulation line on the high pressure side near the expansion valve 76 and between the condensers 71 and the expansion valve 76. The pressure detected by the pressure sensor 390 or 306 for high pressure can be determined in such a way that the lower the detected pressure, the lower the refrigerant flow passing through the expansion valve 76 has become, or the greater the difference between the radiation heat capacity and the endothermic heat capacity has become.

Further, as shown in FIG. 9, when the pressure sensors 305 for sensing low pressure (when in the heating mode) is provided in the line downstream of the expansion valve 76 and upstream of the evaporator 70, and the pressure sensors 306 for sensing high pressure (when in the heating mode) is provided in the line downstream of the condensers 71, the difference between the pressure detected by the pressure sensors 306 for high pressure and that detected by the pressure sensors 305 for low pressure can be determined in such a way that the smaller the difference between the high pressure and the low pressure, the lower the refrigerant flow passing through the expansion valve 76 has become, or the greater the difference between the radiation heat capacity and the endothermic heat capacity has become.

In the embodiment shown in FIG. 3, a temperature sensor 400 is provided to detect the outside temperature. The temperature detected by the temperature sensor 400 can be determined in such a way that the lower the detected temperature, the greater the difference between the radiation heat capacity and the endothermic heat capacity has become.

In the embodiment shown in FIG. 11 with reference to FIG. 3, the temperature sensor 400 for sensing the outside temperature, a temperature sensor 402b for sensing the temperature of the refrigerant upstream of the evaporator (the outside heat-exchanger 70), and a temperature sensor 402c for sensing the temperature of the refrigerant passing through the evaporator are provided. The difference between the temperature detected by the temperature sensor 400 and the temperature detected by the temperature sensor 402b or 402c can be determined in such a way that the higher the difference in the detected temperature, the greater the difference between the radiation heat capacity and the endothermic heat capacity has become.

As shown in FIGS. 3 and 9, when the temperature sensor 400 for sensing the outside temperature and the pressure sensor 306 for sensing the pressure in the refrigerant circulation line on the high pressure side, i.e., the line from the compressors A and B to the expansion valve 76 via the inside heat-exchangers 71 (condenser) are provided, the lower the outside temperature, the higher the target high pressure is selected, wherein the target high pressure is higher than the detected pressures. The high pressure detected by the pressure sensor 306 can be determined in such a way that the greater the difference between the detected pressure and the target pressure, the greater the difference between the radiation heat capacity and the endothermic heat capacity has become.

In FIG. 15 with reference to FIG. 14, a pressure sensor is provided at two positions apart from each other at least either in the line on the high pressure side or in the line on the low pressure side, and a decision means is provided, which means determines the amount of the refrigerant passing through the expansion valve in such a way that the greater the difference between the pressures detected by a pair of pressure sensors, the lower the amount of the refrigerant has become. In the above, control is conducted in such a way that the lower the amount of the refrigerant, the greater the difference between the radiation heat capacity and the endothermic heat capacity has become.

Figure 21:
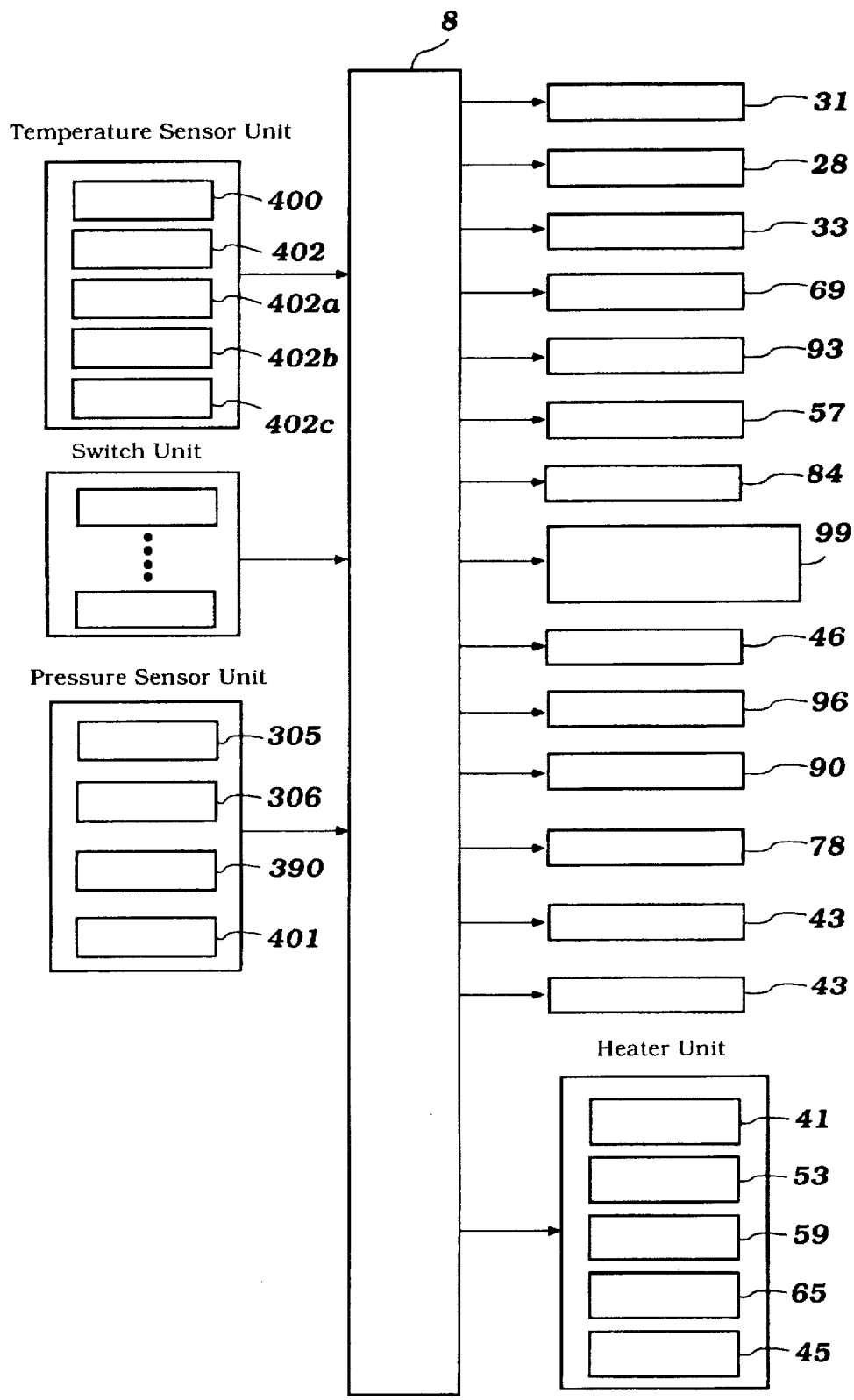
FIG. 21 is a schematic block chart showing a control system of an embodiment of the present invention, comprising a switch group, a temperature sensor group, a pressure sensor group, a control group, a heater group, and an actuator group.

FIG. 21 is a schematic block chart showing the sensing system group, the control system unit, and the output system group.

In the present invention, each flow control mechanism described above can be employed singly or in combination of two or more to achieve the objective of the present invention, i.e., compensation for insufficient endothermic heat capacity to stabilize heat pumping operation, or controlling refrigerant flow through the expansion valve.

Further, this invention can be adapted to control of refrigerant flow when in the cooling mode, e.g., when the outside conditions are cold or windy. In the cooling mode, the inside heat-exchanger functions as an evaporator, and the outside heat-exchanger functions as a condenser.

Operation of Heat Capacity and Refrigerant Flow Control

As described above, an air-conditioning system of the present invention is provided with an energy compensation system and/or a refrigerant flow control system which allows for stable heating operation by controlling the flow passing through the expansion valve and/or compensating for insufficient endothermic heat capacity, especially when condensation capacity increases due to, for example, a cold or windy environment. The above goal in the heating mode can be achieved by fulfilling at least one of the operations d-j described below corresponding to the following target or present conditions A-L:

A. When a temperature sensing means for sensing the outside temperature is provided, control is conducted in such a way that the lower the temperature, the higher the degree of control becomes.

B. When a temperature sensing means for detecting the outside temperature and a pressure sensing means for detecting the pressure in the refrigerant circulation line on the low pressure side, i.e., the line from the expansion valve to the compressor via the evaporator, are provided, the lower the detected temperature, the higher the target low pressure is selected, and control is conducted in such a way that the greater the difference between the detected low pressure and the target low pressure, the lower the difference in pressure becomes.

C. When a temperature sensing means for detecting the outside temperature and a pressure sensing means for detecting the pressure in the refrigerant circulation line on the high pressure side, i.e., the line from the compressor to the expansion valve via the condenser, are provided, the lower the detected temperature, the higher the target high pressure is selected, and control is conducted in such a way that the higher the difference between the target pressure and the detected pressure, the lower the difference in pressure becomes.

E. When an opening sensing means for detecting the opening of the evaporator and a pressure sensing means for detecting the pressure in the refrigerant circulation line on the high pressure side, i.e., the line from the compressor to the expansion valve via the condenser, are provided, the smaller the opening of the evaporation valve, the higher the target high pressure is selected, and control is conducted in such a way that the higher the difference between the target pressure and the detected pressure, the lower the difference in pressure becomes.

F. When a pressure sensing means for sensing high pressure is provided in the high pressure line between the compressor and the expansion valve, control is conducted in such a way that the lower the detected pressure, the higher the pressure becomes.

G. When a pressure sensing means for sensing low pressure is provided in the low pressure line between the expansion valve and the compressor, control is conducted in such a way that the lower the detected low pressure, the higher the pressure becomes.

H. When a pressure sensing means is provided upstream of the expansion valve on the high pressure side, and a pressure sensing means is provided downstream of the expansion valve on the low pressure side, control is conducted in such a way that the smaller the difference between the detected pressures, the greater the difference becomes.

I. When, in the refrigerant circulation line in which refrigerant circulates through the compressor, the inside heat-exchanger, the expansion valve, and the outside heat-exchanger, in sequence, the line from the outside heat-exchanger to the expansion valve is longer than the line from the outside heat-exchanger to the compressor, (1) a pressure sensing means is provided at two positions apart from each other in the line on the high pressure side, and control is conducted in such a way that the greater the difference between the pressure measured by the pressure sensing means positioned farther from the expansion valve than is the other sensing means and the pressure measured by the other sensing means positioned closer to the expansion valve than the former, the smaller the difference becomes; or (2) a pressure sensing means is provided at two positions apart from each other in the line on the low pressure side, and control is conducted in such a way that the greater the difference between the pressures measured by the respective pressure sensing means, the greater the difference becomes J. When an expansion valve is placed on a higher level than is an outside heat-exchanger, a level sensing means is provided, and control is conducted in such a way that the greater the difference in height, the higher the degree of control becomes.

K. When pressure sensing means for detecting the pressure in the high pressure refrigerant line downstream of the compressor and upstream of the expansion valve, as well as temperature sensing means for detecting the refrigerant temperature in the line between the inside heat-exchanger functioning as an evaporator and the expansion valve, are provided, control is conducted in such a way that when the difference between the detected temperature and the saturated temperature calculated based on the refrigerant pressure in the high pressure refrigerant line occurs, the difference becomes zero or negative.

L. One or more of the above A-K are combined.

Figure 19:
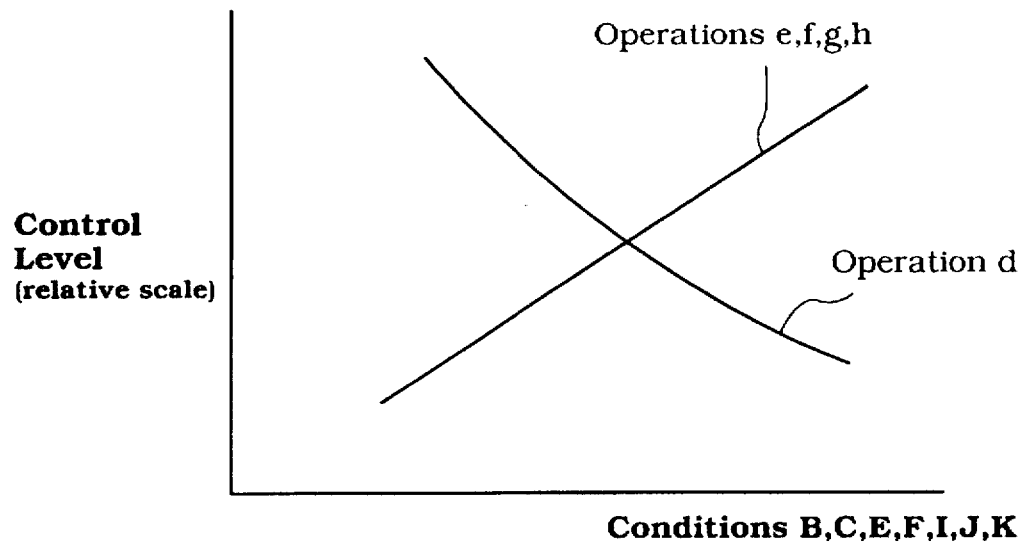
FIG. 19 is a schematic graph showing the conceptual relationship between the degree of control factors e–h and the degree of conditions B, C, E, F, I, J, and K in an embodiment of the present invention.
Figure 20:
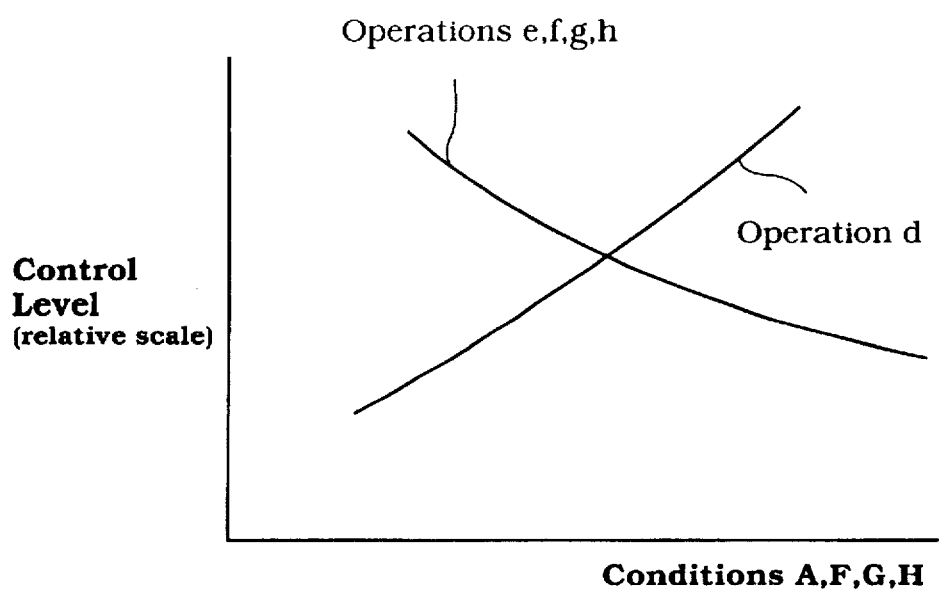
FIG. 20 is a schematic graph showing the conceptual relationship between the degree of control factors e–h and the degree of conditions A, F, G, and H in an embodiment of the present invention.

Operations to satisfy the above target conditions are as follows, and control can be achieved as shown in FIGS. 19 and 20:

d. Operation of a fan for heating the evaporator is discontinued or slowed.

e. A bypass line, which bypasses the outside heat-exchanger and communicates the refrigeration circulation line upstream of the outside heat-exchanger and the line downstream of the outside heat-exchanger, and which is provided with a linearly controlled valve therein, is provided, and the opening of the valve is enlarged or full.

f. A bypass line, which bypasses the expansion valve and the outside heat-exchanger and communicates the refrigeration circulation line downstream of the inside heat-exchanger and that downstream of the outside heat-exchanger, and which is provided with a linearly controlled valve therein, is provided, and the opening of the valve is enlarged or full.

g. Heat exerted onto the refrigerant on the low pressure side is increased.

h. Heat exerted onto the refrigerant on the high pressure side is increased.

i. In above "g" or "h", heat from the engine cooling water is exerted onto the refrigerant.

j. Control is conducted by a combination of a–i.

It will be understood by those of skill in the art that numerous variations and modifications can be made without departing from the spirit of the present invention. Therefore, it should be clearly understood that the forms of the present invention are illustrative only and are not intended to limit the scope of the present invention.

We claim:

1. An air-conditioning apparatus for heating or cooling a room, comprising a refrigerant circulation line in which a refrigerant circulates, said refrigerant circulation line comprising: a compressor for circulating said refrigerant, said compressor being driven by a water-cooled engine; a condenser for exchanging heat between said refrigerant and the air outside said condenser; an expansion valve; and an evaporator for exchanging heat between said refrigerant and the air outside said evaporator, wherein the refrigerant circulation line downstream of said compressor and upstream of said expansion valve constitutes a high pressure refrigerant line, and the refrigerant circulation line downstream of said expansion valve and upstream of said compressor constitutes a low pressure refrigerant line, said apparatus further comprising: a heat capacity detection mechanism for determining the difference between the radiation heat capacity of said condenser and the endothermic heat capacity of said evaporator, said heat capacity detection mechanism comprising a pressure sensor provided at least either in the refrigerant circulation line downstream of the compressor and upstream of the expansion valve or in the refrigerant circulation line downstream of the expansion valve and upstream of the compressor, wherein the difference between the radiation heat capacity and the endothermic heat capacity is determined by using said pressure sensor; and an energy-supplying mechanism for exerting energy onto said refrigerant when heating the room according to the difference between said radiation heat capacity and said endothermic heat capacity, said energy-supplying mechanism comprising a cooling water circulation loop, in which cooling water circulates through the water-cooled engine, to exchange heat between the cooling water and the refrigerant in the refrigerant circulation line down stream of the expansion valve and upstream of the compressor.

2. An air-conditioning apparatus according to claim 1, wherein said energy-supplying mechanism exerts energy onto the refrigerant in such a way that the higher the difference between said radiation heat capacity and said endothermic heat capacity, the greater the energy exerted onto said refrigerant becomes.

3. An air-conditioning apparatus according to claim 1, further comprising a four-way valve for reversing the flow of said refrigerant at said condenser and at said evaporator to switch the operation mode between the heating mode and the cooling mode, said four-way valve being provided downstream of said compressor, wherein said condenser is an inside heat-exchanger when in the heating mode and is an outside heat-exchanger when in the cooling mode, and said evaporator is said inside heat-exchanger when in the cooling mode and is said outside heat-exchanger when in the heating mode, wherein said energy-supplying mechanism is provided either in the high pressure refrigerant line between said compressor and said expansion valve via said inside heat-exchanger functioning as a condenser when in the heating mode or in the low pressure refrigerant line between said expansion valve and said compressor via said outside heat-exchanger functioning as an evaporator when in the heating mode.

4. An air-conditioning apparatus according to claim 3, wherein said energy-supplying mechanism is provided in the low pressure refrigerant line downstream of said four-way valve and upstream of said compressor when in the heating mode.

5. An air-conditioning apparatus according to claim 3, further comprising an accumulator for accumulating a liquid refrigerant provided in the low pressure refrigerant line upstream of said compressor, said accumulator comprising refrigerant-heating means for heating the liquid refrigerant in said accumulator, wherein said energy-supplying mechanism is said refrigerant-heating means.

6. An air-conditioning apparatus for heating or cooling a room, comprising a refrigerant circulation line in which a refrigerant circulates, said refrigerant circulation line comprising: a compressor for circulating said refrigerant; a condenser for exchanging heat between said refrigerant and the air outside said condenser; an expansion valve; and an evaporator for exchanging heat between said refrigerant and the air outside said evaporator, wherein said apparatus further comprises: a heat capacity detection mechanism for determining the difference between the radiation heat capacity of said condenser and the endothermic heat capacity of said evaporator, said heat capacity detection mechanism comprising a pressure sensor provided at least either in the refrigerant circulation line downstream of the compressor and upstream of the expansion valve or in the refrigerant circulation line downstream of the expansion valve and upstream of the compressor, wherein the difference between the radiation heat capacity and the endothermic heat capacity is determined by using said pressure sensor; and a heat-exchange control mechanism for reducing heat exchanged between the air surrounding said evaporator and the refrigerant passing through said evaporator when heating the room, according to the difference between said radiation heat capacity and said endothermic heat capacity, said heat-exchange control mechanism reduces or discontinues the refrigerant flow passing through said evaporator.

7. A method for stable air-conditioning operation, comprising the steps of: (a) circulating a refrigerant in a refrigerant circulation line comprising: a compressor driven by a water-cooled engine, for circulating said refrigerant; a condenser for exchanging heat between said refrigerant and the air outside said condenser; an expansion valve; and an evaporator for exchanging heat between said refrigerant and the air outside said evaporator; (b) determining the difference between the radiation heat capacity of said condenser and the endothermic heat capacity of said evaporator based on the pressure of at least either the refrigerant circulation line downstream of the compressor and upstream of the expansion valve or the refrigerant circulation line downstream of the expansion valve and upstream of the compressor; and (c) exerting energy onto said refrigerant when heating a room, according to the difference between said radiation heat capacity and said endothermic heat capacity, by exchanging heat between the cooling water circulating through the water-cooled engine and the refrigerant in the refrigerant circulation line down stream of the expansion valve and upstream of the compressor.

8. A method according to claim 7, wherein, in step (c), the energy is exerted onto the refrigerant in such a way that the higher the difference between said radiation heat capacity and said endothermic heat capacity, the greater the energy exerted onto said refrigerant becomes.

9. A method for stable air-conditioning operation, comprising the steps of: (a) circulating a refrigerant in a refrigerant circulation line comprising: a compressor for circulating said refrigerant; a condenser for exchanging heat between said refrigerant and the air outside said condenser; an expansion valve; and an evaporator for exchanging heat between said refrigerant and the air outside said evaporator; (b) determining the difference between the radiation heat capacity of said condenser and the endothermic heat capacity of said evaporator based on the pressure of at least either the refrigerant circulation line downstream of the compressor and upstream of the expansion valve or the refrigerant circulation line downstream of the expansion valve and upstream of the compressor; and (c) reducing heat exchanged between the air surrounding said evaporator and the refrigerant passing through said evaporator when heating the room, according to the difference between said radiation heat capacity and said endothermic heat capacity, by reducing or discontinuing the refrigerant flow passing through said evaporator.

* * * * *